US008989084B2

(12) United States Patent
Hande et al.

(10) Patent No.: US 8,989,084 B2
(45) Date of Patent: Mar. 24, 2015

(54) METHODS AND APPARATUS FOR BROADCASTING LOADING INFORMATION CORRESPONDING TO NEIGHBORING BASE STATIONS

(75) Inventors: Prashanth Hande, Somerset, NJ (US); Arnab Das, Jersey City, NJ (US); Junyi Li, Bedminster, NJ (US); Sundeep Rangan, Jersey City, NJ (US); Rajiv Laroia, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 2244 days.

(21) Appl. No.: 11/549,604

(22) Filed: Oct. 13, 2006

(65) Prior Publication Data

US 2007/0253355 A1    Nov. 1, 2007

Related U.S. Application Data

(63) Continuation-in-part of application No. 11/251,069, filed on Oct. 14, 2005, and a continuation-in-part of application No. 11/302,729, filed on Dec. 14, 2005, and a continuation-in-part of application No. 11/486,714, filed on Jul. 14, 2006, and a continuation-in-part of application No. 11/487,017, filed on Jul. 14, 2006.

(51) Int. Cl.
*H04W 4/00*       (2009.01)
*H04W 16/08*      (2009.01)
*H04W 16/06*      (2009.01)

(52) U.S. Cl.
CPC .............. *H04W 16/08* (2013.01); *H04W 16/06* (2013.01); *Y02B 60/50* (2013.01); *H04B 17/24* (2013.01); *H04B 17/382* (2013.01)
USPC ............................. 370/328; 455/453; 455/445

(58) Field of Classification Search
USPC ......................................................... 370/328
See application file for complete search history.

(56) References Cited

U.S. PATENT DOCUMENTS 4,631,720 A    12/1986   Koeck
4,660,196 A     4/1987   Gray et al.
(Continued)

FOREIGN PATENT DOCUMENTS

CN    1159262 A    9/1997
CN    1159286 A    9/1997
(Continued)

OTHER PUBLICATIONS

Gunnarson, F. et al.: "Uplink Admission Control in WCDMA Based on Relative Load Estimates", IEEE International Conference on Communications, vol. 1, pp. 3091-3095, IEEE, New York, NY USA (Apr. 28, 2002).

(Continued)

*Primary Examiner* — Anthony Addy
*Assistant Examiner* — Natasha Cosme
(74) *Attorney, Agent, or Firm* — John J. Ketchum

(57) ABSTRACT

Methods and apparatus are described where loading information regarding loading conditions at a neighboring base station is received at a first base station and then communicated, e.g., broadcast, by the first base station to mobiles within the cell in which the first base station is located. Since the neighbor base station's loading information is being communicated to a mobile currently connected to the first base station via a reliable communications channel of the first base station, the mobile can be expected to be able to reliably recover loading factor information corresponding to not only the first base station but to the neighboring base station. By utilizing such loading factor information, the mobile can generate an improved uplink interference report. The first base station receives such interference reports from wireless terminals in its cell, facilitating efficient resource allocation and interference control.

37 Claims, 13 Drawing Sheets

(56) References Cited

U.S. PATENT DOCUMENTS

| | | | |
|---|---|---|---|
| 4,679,244 A | 7/1987 | Kawasaki et al. | |
| 4,833,701 A | 5/1989 | Comroe et al. | |
| 5,128,938 A | 7/1992 | Borras | |
| 5,203,013 A | 4/1993 | Breeden et al. | |
| 5,387,905 A | 2/1995 | Grube et al. | |
| 5,434,848 A | 7/1995 | Chimento, Jr. et al. | |
| 5,461,645 A | 10/1995 | Ishii | |
| 5,465,389 A | 11/1995 | Agrawal et al. | |
| 5,506,865 A | 4/1996 | Weaver, Jr. | |
| 5,537,414 A | 7/1996 | Takiyasu et al. | |
| 5,579,307 A | 11/1996 | Richetta et al. | |
| 5,732,328 A | 3/1998 | Mitra et al. | |
| 5,835,847 A | 11/1998 | Gilmore et al. | |
| 5,867,478 A | 2/1999 | Baum et al. | |
| 5,898,925 A | 4/1999 | Honkasalo et al. | |
| 5,914,950 A | 6/1999 | Tiedemann, Jr. et al. | |
| 5,915,221 A * | 6/1999 | Sawyer et al. | 455/437 |
| 5,923,650 A | 7/1999 | Chen et al. | |
| 5,933,421 A | 8/1999 | Alamouti et al. | |
| 5,940,771 A | 8/1999 | Gollnick et al. | |
| 5,966,657 A | 10/1999 | Sporre | |
| 5,966,662 A | 10/1999 | Murto | |
| 5,978,657 A | 11/1999 | Suzuki | |
| 5,999,534 A | 12/1999 | Kim | |
| 6,002,676 A | 12/1999 | Fleming | |
| 6,004,276 A | 12/1999 | Wright et al. | |
| 6,026,081 A | 2/2000 | Hamabe | |
| 6,028,842 A | 2/2000 | Chapman et al. | |
| 6,028,843 A | 2/2000 | Delp et al. | |
| 6,035,000 A | 3/2000 | Bingham | |
| 6,069,871 A | 5/2000 | Sharma et al. | |
| 6,070,072 A | 5/2000 | Dorenbosch et al. | |
| 6,073,025 A | 6/2000 | Chheda et al. | |
| 6,075,025 A | 6/2000 | Bishop et al. | |
| 6,122,270 A | 9/2000 | Whinnett et al. | |
| 6,128,506 A | 10/2000 | Knutsson et al. | |
| 6,131,016 A | 10/2000 | Greenstein et al. | |
| 6,141,565 A | 10/2000 | Feuerstein et al. | |
| 6,169,896 B1 | 1/2001 | Sant et al. | |
| 6,173,005 B1 | 1/2001 | Kotzin et al. | |
| 6,181,948 B1 | 1/2001 | Kondo | |
| 6,201,793 B1 | 3/2001 | Chen et al. | |
| 6,205,129 B1 | 3/2001 | Esteves et al. | |
| 6,215,791 B1 | 4/2001 | Kim | |
| 6,236,646 B1 | 5/2001 | Beming et al. | |
| 6,256,478 B1 | 7/2001 | Allen et al. | |
| 6,259,927 B1 | 7/2001 | Butovitsch et al. | |
| 6,263,392 B1 | 7/2001 | McCauley | |
| 6,298,233 B1 | 10/2001 | Souissi et al. | |
| 6,308,080 B1 | 10/2001 | Burt et al. | |
| 6,310,857 B1 | 10/2001 | Duffield et al. | |
| 6,311,065 B1 | 10/2001 | Ushiki et al. | |
| 6,374,085 B1 | 4/2002 | Saints et al. | |
| 6,377,583 B1 | 4/2002 | Lyles et al. | |
| 6,377,955 B1 | 4/2002 | Hartmann et al. | |
| 6,405,047 B1 | 6/2002 | Moon | |
| 6,414,946 B1 | 7/2002 | Satou et al. | |
| 6,445,917 B1 | 9/2002 | Bark et al. | |
| 6,453,151 B1 | 9/2002 | Kiang et al. | |
| 6,493,539 B1 | 12/2002 | Falco et al. | |
| 6,526,281 B1 | 2/2003 | Gorsuch et al. | |
| 6,538,986 B2 | 3/2003 | Isaksson et al. | |
| 6,545,999 B1 | 4/2003 | Sugita | |
| 6,549,780 B2 | 4/2003 | Schiff et al. | |
| 6,553,336 B1 | 4/2003 | Johnson et al. | |
| 6,590,890 B1 | 7/2003 | Stolyar et al. | |
| 6,597,914 B1 | 7/2003 | Silventoinen et al. | |
| 6,600,903 B1 | 7/2003 | Lilja et al. | |
| 6,609,007 B1 | 8/2003 | Eibling et al. | |
| 6,621,808 B1 | 9/2003 | Sadri | |
| 6,625,133 B1 | 9/2003 | Balachandran et al. | |
| 6,662,024 B2 | 12/2003 | Walton et al. | |
| 6,671,512 B2 | 12/2003 | Laakso | |
| 6,680,909 B1 | 1/2004 | Bansal et al. | |
| 6,697,417 B2 | 2/2004 | Fernandez-Corbaton et al. | |
| 6,710,651 B2 | 3/2004 | Forrester | |
| 6,728,551 B2 | 4/2004 | Chang | |
| 6,742,020 B1 | 5/2004 | Dimitroff et al. | |
| 6,745,003 B1 | 6/2004 | Maca et al. | |
| 6,751,187 B2 | 6/2004 | Walton et al. | |
| 6,771,934 B2 | 8/2004 | Demers et al. | |
| 6,788,963 B2 | 9/2004 | Laroia et al. | |
| 6,798,761 B2 | 9/2004 | Cain et al. | |
| 6,804,289 B2 | 10/2004 | Takahashi | |
| 6,804,521 B2 | 10/2004 | Tong et al. | |
| 6,816,476 B2 | 11/2004 | Kim et al. | |
| 6,836,673 B1 | 12/2004 | Trott | |
| 6,865,168 B1 | 3/2005 | Sekine | |
| 6,889,056 B2 | 5/2005 | Shibutani | |
| 6,892,071 B2 | 5/2005 | Park et al. | |
| 6,895,005 B1 | 5/2005 | Malin et al. | |
| 6,895,364 B2 | 5/2005 | Banfer | |
| 6,901,268 B2 | 5/2005 | Chang | |
| 6,901,270 B1 | 5/2005 | Beach | |
| 6,904,016 B2 | 6/2005 | Kuo et al. | |
| 6,912,405 B2 | 6/2005 | Hiramatsu et al. | |
| 6,917,607 B1 | 7/2005 | Yeom et al. | |
| 6,940,827 B2 | 9/2005 | Li et al. | |
| 6,954,643 B2 | 10/2005 | Petrus | |
| 6,957,072 B2 | 10/2005 | Kangras et al. | |
| 6,967,937 B1 | 11/2005 | Gormley | |
| 6,968,156 B2 | 11/2005 | Sugaya et al. | |
| 7,006,841 B2 | 2/2006 | Monogioudis et al. | |
| 7,024,460 B2 | 4/2006 | Koopmas et al. | |
| 7,027,782 B2 | 4/2006 | Moon et al. | |
| 7,031,983 B2 | 4/2006 | Israni et al. | |
| 7,034,254 B2 | 4/2006 | Grabowski et al. | |
| 7,039,029 B2 | 5/2006 | Lee et al. | |
| 7,043,254 B2 | 5/2006 | Chawla et al. | |
| 7,047,009 B2 | 5/2006 | Laroia et al. | |
| 7,054,643 B2 | 5/2006 | Trossen et al. | |
| 7,061,885 B2 | 6/2006 | Kurtz | |
| 7,092,672 B1 | 8/2006 | Pekonen et al. | |
| 7,120,123 B1 | 10/2006 | Quigley et al. | |
| 7,120,448 B2 | 10/2006 | Brouwer | |
| 7,123,910 B2 | 10/2006 | Lucidarme et al. | |
| 7,139,536 B2 | 11/2006 | Chiu | |
| 7,142,548 B2 | 11/2006 | Fong et al. | |
| 7,146,172 B2 | 12/2006 | Li et al. | |
| 7,158,796 B2 * | 1/2007 | Tiedemann et al. | 455/453 |
| 7,161,909 B2 | 1/2007 | Sharma | |
| 7,162,203 B1 | 1/2007 | Brunner | |
| 7,164,883 B2 | 1/2007 | Rappaport et al. | |
| 7,197,025 B2 | 3/2007 | Chuah | |
| 7,203,493 B2 | 4/2007 | Fujii et al. | |
| 7,245,935 B2 | 7/2007 | Lin | |
| 7,260,054 B2 | 8/2007 | Olszewski | |
| 7,269,406 B2 | 9/2007 | Qi | |
| 7,277,709 B2 | 10/2007 | Vadgama | |
| 7,277,737 B1 | 10/2007 | Vollmer et al. | |
| 7,280,814 B2 | 10/2007 | Austin et al. | |
| 7,283,559 B2 | 10/2007 | Cho et al. | |
| 7,283,836 B2 | 10/2007 | Hwang et al. | |
| 7,299,277 B1 | 11/2007 | Moran et al. | |
| 7,317,921 B2 | 1/2008 | Mueckenheim et al. | |
| 7,319,680 B2 | 1/2008 | Cho | |
| 7,321,563 B2 | 1/2008 | Kim et al. | |
| 7,340,267 B2 | 3/2008 | Budka et al. | |
| 7,349,667 B2 | 3/2008 | Magee et al. | |
| 7,356,635 B2 | 4/2008 | Woodings et al. | |
| 7,362,702 B2 | 4/2008 | Terrell et al. | |
| 7,382,755 B2 | 6/2008 | Dugad et al. | |
| 7,395,058 B1 | 7/2008 | Kalofonos et al. | |
| 7,397,803 B2 | 7/2008 | Love et al. | |
| 7,400,901 B2 | 7/2008 | Kostic et al. | |
| 7,412,265 B2 | 8/2008 | Chen et al. | |
| 7,418,260 B2 | 8/2008 | Lucidarme | |
| 7,430,206 B2 | 9/2008 | Terry et al. | |
| 7,430,207 B2 | 9/2008 | Wu et al. | |
| 7,430,420 B2 | 9/2008 | Derakhshan et al. | |
| 7,447,148 B2 | 11/2008 | Gao et al. | |
| 7,463,577 B2 | 12/2008 | Sudo et al. | |
| 7,486,620 B2 | 2/2009 | Seol | |
| 7,486,638 B2 | 2/2009 | Ofuji et al. | |

(56) References Cited

U.S. PATENT DOCUMENTS

| | | |
|---|---|---|
| 7,502,614 B2 | 3/2009 | Uchida et al. |
| 7,508,792 B2 | 3/2009 | Petrovic et al. |
| 7,512,076 B2 | 3/2009 | Kwon et al. |
| 7,512,185 B2 | 3/2009 | Sharon et al. |
| 7,519,013 B2 | 4/2009 | Destino et al. |
| 7,519,033 B2 | 4/2009 | Soomro |
| 7,522,544 B2 | 4/2009 | Cheng et al. |
| 7,525,971 B2 | 4/2009 | Carroll et al. |
| 7,526,091 B2 | 4/2009 | Jeong et al. |
| 7,539,475 B2 | 5/2009 | Laroia et al. |
| 7,558,572 B2 | 7/2009 | Anigstein |
| 7,561,893 B2 | 7/2009 | Moulsley et al. |
| 7,668,573 B2 | 2/2010 | Laroia et al. |
| 7,743,284 B1 | 6/2010 | Taylor et al. |
| 8,040,831 B2 | 10/2011 | Kurtz et al. |
| 8,325,621 B2 | 12/2012 | Simonsson et al. |
| 8,437,251 B2 | 5/2013 | Das et al. |
| 2001/0036181 A1 | 11/2001 | Rogers |
| 2001/0055293 A1 | 12/2001 | Parsa et al. |
| 2002/0031105 A1 | 3/2002 | Zeira et al. |
| 2002/0037729 A1 | 3/2002 | Kitazawa et al. |
| 2002/0075835 A1 | 6/2002 | Krishnakumar et al. |
| 2002/0080967 A1 | 6/2002 | Abdo et al. |
| 2002/0085516 A1 | 7/2002 | Bridgelall |
| 2002/0093953 A1 | 7/2002 | Naim et al. |
| 2002/0107028 A1 | 8/2002 | Rantalainen et al. |
| 2002/0143858 A1 | 10/2002 | Teague et al. |
| 2002/0177452 A1 | 11/2002 | Ruutu et al. |
| 2002/0186678 A1 | 12/2002 | Averbuch et al. |
| 2003/0007498 A1 | 1/2003 | Angle et al. |
| 2003/0012212 A1 | 1/2003 | Earnshaw et al. |
| 2003/0027587 A1 | 2/2003 | Proctor et al. |
| 2003/0028606 A1 | 2/2003 | Koopmans et al. |
| 2003/0064737 A1 | 4/2003 | Eriksson et al. |
| 2003/0100269 A1 | 5/2003 | Lehtinen et al. |
| 2003/0114180 A1 | 6/2003 | Black et al. |
| 2003/0123396 A1 | 7/2003 | Seo et al. |
| 2003/0123410 A1 | 7/2003 | Youm |
| 2003/0144042 A1 | 7/2003 | Weinfield et al. |
| 2003/0169705 A1 | 9/2003 | Knisely et al. |
| 2003/0185224 A1 | 10/2003 | Ramanan et al. |
| 2003/0185285 A1 | 10/2003 | Talwar |
| 2003/0198204 A1 | 10/2003 | Taneja et al. |
| 2003/0206541 A1 | 11/2003 | Yun et al. |
| 2003/0207691 A1 | 11/2003 | Chen |
| 2003/0207693 A1 | 11/2003 | Roderique |
| 2003/0214906 A1 | 11/2003 | Hu et al. |
| 2004/0001429 A1 | 1/2004 | Ma et al. |
| 2004/0013103 A1 | 1/2004 | Zhang et al. |
| 2004/0057402 A1 | 3/2004 | Ramos et al. |
| 2004/0062206 A1 | 4/2004 | Soong et al. |
| 2004/0081089 A1 | 4/2004 | Ayyagari et al. |
| 2004/0082344 A1 | 4/2004 | Moilanen et al. |
| 2004/0085936 A1 | 5/2004 | Gopalakrishnan et al. |
| 2004/0091026 A1 | 5/2004 | Nakayama |
| 2004/0111640 A1 | 6/2004 | Baum |
| 2004/0120411 A1 | 6/2004 | Walton et al. |
| 2004/0125776 A1 | 7/2004 | Haugli et al. |
| 2004/0131007 A1 | 7/2004 | Smee et al. |
| 2004/0147262 A1 | 7/2004 | Lescuyer et al. |
| 2004/0147276 A1 | 7/2004 | Gholmieh et al. |
| 2004/0160922 A1 | 8/2004 | Nanda et al. |
| 2004/0162097 A1 | 8/2004 | Vijayan et al. |
| 2004/0166869 A1 | 8/2004 | Laroia et al. |
| 2004/0166886 A1 | 8/2004 | Laroia et al. |
| 2004/0166887 A1* | 8/2004 | Laroia et al. ................ 455/522 |
| 2004/0171401 A1 | 9/2004 | Balachandran et al. |
| 2004/0180658 A1 | 9/2004 | Uchida et al. |
| 2004/0184410 A1 | 9/2004 | Park |
| 2004/0192371 A1 | 9/2004 | Zhao et al. |
| 2004/0196802 A1 | 10/2004 | Bae et al. |
| 2004/0203717 A1 | 10/2004 | Wingrowicz et al. |
| 2004/0218617 A1 | 11/2004 | Sagfors |
| 2004/0224677 A1 | 11/2004 | Kuchibhotla et al. |
| 2004/0228313 A1 | 11/2004 | Cheng et al. |
| 2004/0233838 A1 | 11/2004 | Sudo et al. |
| 2004/0235510 A1 | 11/2004 | Elicegui et al. |
| 2004/0248518 A1 | 12/2004 | Kashiwase |
| 2004/0258040 A1 | 12/2004 | Joshi et al. |
| 2004/0259546 A1 | 12/2004 | Balachandran et al. |
| 2004/0264414 A1 | 12/2004 | Dorenbosch |
| 2005/0008892 A1 | 1/2005 | Yamamoto et al. |
| 2005/0037775 A1 | 2/2005 | Moeglein et al. |
| 2005/0047393 A1 | 3/2005 | Liu |
| 2005/0047416 A1 | 3/2005 | Heo et al. |
| 2005/0053099 A1 | 3/2005 | Spear et al. |
| 2005/0058637 A1 | 3/2005 | Lynn et al. |
| 2005/0064821 A1 | 3/2005 | Hedberg et al. |
| 2005/0068922 A1 | 3/2005 | Jalali |
| 2005/0085197 A1 | 4/2005 | Laroia et al. |
| 2005/0099987 A1 | 5/2005 | Lester et al. |
| 2005/0111361 A1 | 5/2005 | Hosein |
| 2005/0118993 A1 | 6/2005 | Roux et al. |
| 2005/0122900 A1 | 6/2005 | Tuulos et al. |
| 2005/0124345 A1 | 6/2005 | Laroia et al. |
| 2005/0135320 A1 | 6/2005 | Tiedemann et al. |
| 2005/0136937 A1 | 6/2005 | Qian et al. |
| 2005/0143084 A1 | 6/2005 | Cheng et al. |
| 2005/0143114 A1 | 6/2005 | Moulsley et al. |
| 2005/0152320 A1 | 7/2005 | Marinier et al. |
| 2005/0157803 A1 | 7/2005 | Kim et al. |
| 2005/0170782 A1 | 8/2005 | Rong et al. |
| 2005/0181732 A1 | 8/2005 | Kang et al. |
| 2005/0185632 A1 | 8/2005 | Draves et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0232154 A1 | 10/2005 | Bang et al. |
| 2005/0243938 A1 | 11/2005 | Armstrong et al. |
| 2005/0249118 A1 | 11/2005 | Terry et al. |
| 2005/0250509 A1 | 11/2005 | Choksi |
| 2005/0250510 A1 | 11/2005 | Kaikkonen et al. |
| 2005/0250529 A1 | 11/2005 | Funnell et al. |
| 2005/0255873 A1 | 11/2005 | Zhang et al. |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0018284 A1 | 1/2006 | Rudolf et al. |
| 2006/0019694 A1 | 1/2006 | Sutivong et al. |
| 2006/0034174 A1 | 2/2006 | Nishibayashi et al. |
| 2006/0045013 A1 | 3/2006 | Vannithamby et al. |
| 2006/0056346 A1 | 3/2006 | Vadgama et al. |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0083161 A1 | 4/2006 | Laroia et al. |
| 2006/0089104 A1 | 4/2006 | Kaikkonen et al. |
| 2006/0092881 A1 | 5/2006 | Laroia et al. |
| 2006/0104240 A1 | 5/2006 | Sebire et al. |
| 2006/0126497 A1 | 6/2006 | Na et al. |
| 2006/0128410 A1 | 6/2006 | Derryberry et al. |
| 2006/0133346 A1 | 6/2006 | Chheda et al. |
| 2006/0135193 A1 | 6/2006 | Ratasuk et al. |
| 2006/0140154 A1 | 6/2006 | Kwak et al. |
| 2006/0164981 A1 | 7/2006 | Olsson et al. |
| 2006/0165029 A1 | 7/2006 | Melpignano et al. |
| 2006/0182022 A1 | 8/2006 | Abedi |
| 2006/0203765 A1 | 9/2006 | Laroia et al. |
| 2006/0205356 A1 | 9/2006 | Laroia et al. |
| 2006/0205396 A1 | 9/2006 | Laroia et al. |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0004437 A1 | 1/2007 | Harada et al. |
| 2007/0015541 A1 | 1/2007 | Dominique et al. |
| 2007/0026803 A1 | 2/2007 | Malm |

(56) References Cited

U.S. PATENT DOCUMENTS

| | | |
|---|---|---|
| 2007/0026808 A1 | 2/2007 | Love et al. |
| 2007/0030828 A1 | 2/2007 | Vimpari et al. |
| 2007/0036116 A1 | 2/2007 | Eiger et al. |
| 2007/0054624 A1 | 3/2007 | Kashiwagi |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081498 A1 | 4/2007 | Niwano |
| 2007/0104128 A1 | 5/2007 | Laroia et al. |
| 2007/0104164 A1 | 5/2007 | Laroia et al. |
| 2007/0109999 A1 | 5/2007 | Brunner |
| 2007/0133412 A1 | 6/2007 | Hutter et al. |
| 2007/0140168 A1 | 6/2007 | Laroia et al. |
| 2007/0140179 A1 | 6/2007 | Zhang et al. |
| 2007/0141994 A1 | 6/2007 | Cheng |
| 2007/0147283 A1 | 6/2007 | Laroia et al. |
| 2007/0147377 A1 | 6/2007 | Laroia et al. |
| 2007/0149126 A1 | 6/2007 | Rangan et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das |
| 2007/0149194 A1 | 6/2007 | Das et al. |
| 2007/0149227 A1 | 6/2007 | Parizhsky et al. |
| 2007/0149228 A1 | 6/2007 | Das |
| 2007/0149238 A1 | 6/2007 | Das et al. |
| 2007/0159969 A1 | 7/2007 | Das et al. |
| 2007/0168326 A1 | 7/2007 | Das et al. |
| 2007/0169326 A1 | 7/2007 | Smith |
| 2007/0173208 A1 | 7/2007 | Nishio et al. |
| 2007/0183308 A1 | 8/2007 | Korobkov et al. |
| 2007/0213087 A1 | 9/2007 | Laroia et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253357 A1 | 11/2007 | Das et al. |
| 2007/0253358 A1 | 11/2007 | Das et al. |
| 2007/0253385 A1 | 11/2007 | Li et al. |
| 2007/0253449 A1 | 11/2007 | Das et al. |
| 2007/0258365 A1 | 11/2007 | Das et al. |
| 2008/0031368 A1 | 2/2008 | Lindoff et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2008/0167047 A1 | 7/2008 | Abedi |
| 2009/0004983 A1 | 1/2009 | Darabi |
| 2009/0034455 A1 | 2/2009 | Lee et al. |
| 2009/0103507 A1 | 4/2009 | Gu et al. |
| 2009/0106507 A1 | 4/2009 | Skerlj et al. |
| 2009/0303900 A1 | 12/2009 | Cho et al. |
| 2010/0220626 A1 | 9/2010 | Das et al. |
| 2011/0090812 A1 | 4/2011 | Aoyama |
| 2011/0149789 A1 | 6/2011 | Edge |
| 2012/0140756 A1 | 6/2012 | Rudolf et al. |
| 2013/0230027 A1 | 9/2013 | Das et al. |
| 2013/0242888 A1 | 9/2013 | Das et al. |

FOREIGN PATENT DOCUMENTS

| | | |
|---|---|---|
| CN | 1265792 | 9/2000 |
| CN | 1286006 A | 2/2001 |
| CN | 1286821 A | 3/2001 |
| CN | 1286832 A | 3/2001 |
| CN | 1316140 | 10/2001 |
| CN | 1335036 A | 2/2002 |
| CN | 1338877 A | 3/2002 |
| CN | 1507708 | 6/2004 |
| CN | 1545252 A | 11/2004 |
| CN | 1604685 | 4/2005 |
| DE | 10162564 A1 | 7/2003 |
| EP | 1037419 A2 | 9/2000 |
| EP | 1037491 A1 | 9/2000 |
| EP | 1054518 A1 | 11/2000 |
| EP | 1089500 A2 | 4/2001 |
| EP | 1179962 | 2/2002 |
| EP | 1180881 | 2/2002 |
| EP | 1180907 A2 | 2/2002 |
| EP | 1221273 A1 | 7/2002 |
| EP | 1233637 | 8/2002 |
| EP | 1377100 A2 | 1/2004 |
| EP | 1493284 A1 | 1/2005 |
| EP | 1511245 A2 | 3/2005 |
| EP | 1564953 A2 | 8/2005 |
| EP | 1571762 A1 | 9/2005 |
| EP | 1594260 A1 | 11/2005 |
| EP | 1758276 A1 | 2/2007 |
| EP | 1841259 A2 | 10/2007 |
| GB | 2340693 | 2/2000 |
| JP | 8008806 | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 11122167 | 6/1998 |
| JP | 2000049689 | 2/2000 |
| JP | 2001007761 | 1/2001 |
| JP | 2001016152 | 1/2001 |
| JP | 2001510974 | 8/2001 |
| JP | 2001512921 T | 8/2001 |
| JP | 2001251680 A | 9/2001 |
| JP | 2001523901 T | 11/2001 |
| JP | 2001525135 T | 12/2001 |
| JP | 2002077992 | 3/2002 |
| JP | 2002111627 | 4/2002 |
| JP | 2002262330 A | 9/2002 |
| JP | 2003018641 A | 1/2003 |
| JP | 2003500911 | 1/2003 |
| JP | 2003509983 A | 3/2003 |
| JP | 2003510887 | 3/2003 |
| JP | 2003520153 A | 7/2003 |
| JP | 2003244161 | 8/2003 |
| JP | 2004153585 | 5/2004 |
| JP | 2004297284 A | 10/2004 |
| JP | 2004533731 | 11/2004 |
| JP | 2004350052 | 12/2004 |
| JP | 2005073276 A | 3/2005 |
| JP | 2005130482 | 5/2005 |
| JP | 2005136773 A | 5/2005 |
| JP | 2005142965 A | 6/2005 |
| JP | 2005525730 A | 8/2005 |
| JP | 2005526417 A | 9/2005 |
| JP | 2005333671 | 12/2005 |
| JP | 2006514735 A | 5/2006 |
| JP | 2006518578 A | 8/2006 |
| JP | 06268574 | 10/2006 |
| JP | 2006524966 T | 11/2006 |
| JP | 2006526323 A | 11/2006 |
| JP | 2007503156 A | 2/2007 |
| JP | 2007509531 A | 4/2007 |
| JP | 2007514364 A | 5/2007 |
| JP | 2007514378 T | 5/2007 |
| JP | 2007521685 A | 8/2007 |
| JP | 2007522692 A | 8/2007 |
| JP | 2007525044 A | 8/2007 |
| JP | 2007525045 T | 8/2007 |
| JP | 2011045054 | 3/2011 |
| KR | 1019990084525 | 12/1999 |
| KR | 20010014223 | 2/2001 |
| KR | 20040018526 | 3/2004 |
| KR | 20040053859 A | 6/2004 |
| KR | 20040084599 A | 10/2004 |
| KR | 20040110044 A | 12/2004 |
| KR | 20050021083 A | 3/2005 |
| KR | 20050023187 A | 3/2005 |
| KR | 20050039376 A | 4/2005 |
| KR | 1020050099633 | 10/2005 |
| KR | 1020050121274 | 12/2005 |

(56) References Cited

FOREIGN PATENT DOCUMENTS

| | | |
|---|---|---|
| KR | 20060012282 A | 2/2006 |
| RU | 2149518 | 5/2000 |
| RU | 2181529 | 4/2002 |
| RU | 2188506 | 4/2002 |
| RU | 2202154 | 4/2003 |
| TW | 200423642 | 11/2004 |
| TW | 200539627 | 12/2005 |
| WO | WO-9408432 | 4/1994 |
| WO | WO9623371 | 8/1996 |
| WO | WO9845967 A2 | 10/1998 |
| WO | WO9856120 | 12/1998 |
| WO | 9907090 A1 | 2/1999 |
| WO | WO-9909779 A1 | 2/1999 |
| WO | WO9913600 A1 | 3/1999 |
| WO | WO9959254 A2 | 11/1999 |
| WO | WO0101610 A1 | 1/2001 |
| WO | WO-0122759 A1 | 3/2001 |
| WO | WO0135548 | 5/2001 |
| WO | WO-0142047 A2 | 6/2001 |
| WO | WO 0182604 | 11/2001 |
| WO | WO-0199291 A2 | 12/2001 |
| WO | 0233841 | 4/2002 |
| WO | WO0232183 | 4/2002 |
| WO | WO0239760 A2 | 5/2002 |
| WO | WO0249305 | 6/2002 |
| WO | WO02073831 A1 | 9/2002 |
| WO | 02104058 | 12/2002 |
| WO | WO02101941 | 12/2002 |
| WO | WO03094544 A1 | 11/2003 |
| WO | WO03105498 A1 | 12/2003 |
| WO | WO-2004031918 A2 | 4/2004 |
| WO | 2004077728 A2 | 9/2004 |
| WO | WO2004077685 A2 | 9/2004 |
| WO | WO2004084452 | 9/2004 |
| WO | WO2004084503 A2 | 9/2004 |
| WO | WO2004100450 | 11/2004 |
| WO | WO2004105420 | 12/2004 |
| WO | WO2004110081 A1 | 12/2004 |
| WO | WO-2005018115 A1 | 2/2005 |
| WO | 2005020490 | 3/2005 |
| WO | WO2005034438 | 4/2005 |
| WO | 2005060271 | 6/2005 |
| WO | 2005060277 | 6/2005 |
| WO | WO2005057812 A1 | 6/2005 |
| WO | WO2005060132 | 6/2005 |
| WO | WO 2005065056 | 7/2005 |
| WO | WO2005069519 | 7/2005 |
| WO | WO2005125049 | 12/2005 |
| WO | 2006044718 | 4/2006 |
| WO | WO 2006075293 | 7/2006 |
| WO | WO2007031956 A2 | 3/2007 |

OTHER PUBLICATIONS

International Search Report, PCT/US2006/040542—International Search Authority—European Patent Office—Mar. 29, 2007.
International Preliminary Report on Patentability, PCT/US2006/040542—International Search Authority—The international Bureau of WIPO—Geneva, Switzerland—Apr. 16, 2008.
Written Opinion, PCT/US2006/040542—International Search Authority—European Patent Office—Mar. 29, 2007.
Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004). Oct. 18-20, 2004, pp. 654-658.
Kwon, et al., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.
Majmundar, "Impact of Mobile-Originated Short Message Service on the Digital Control Channel of TDMA Systems," Vehicular Technology Conference, 2000. IEEE VTS Fall VTC 2000. 52nd Sep. 24-28, 2000, Piscataway, NJ, USA, IEEE, Sep. 24, 2000, pp. 1550-1555.
Wada, "Study of an OFDM Cellular System Using a Single Band," 2002 Communication Society Convention, Collection of Lecture Papers 1, Japan, IEEE, Aug. 20, 2002, p. 355, B-5-58.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 184-190, Sep. 2004.
Hang Zhang et al, "Clean up for Closed-Loop MIMO in H-ARQ MAP IE", IEEE P802.16e/D7 Broadband Wireless Access Working Group <http://ieee802.org/16>, pp. 1-6, Mar. 10, 2010.
3GPP: ETSI TS 125 331 V6.3.0: Radio Resource Control (RRC) protocol specification (3GPP TS 25.331 version 6.3.0 Release 6), ETSI TS 125 331, Sep. 1, 2004, pp. 49, 202-209, 220,221,406,579-585,589, 930.
Ericsson: Discussion on SIR Measurement, TSG-RAN Working Group 4 (Radio) meeting #18, Berlin, Germany, 3GPP TS 25.101 V3.7.0, Jul. 9, 2001, R4-010895, URL: http://www.3gpp.org/ftp/tsg_ran/WG4_18/Docs/R4-010895.zip.
European Search Report—EP11165270, Search Authority—Berlin Patent Office: Jun. 6, 2011.
Taiwanese Search report—095137979—TIPO—Dec. 14, 2010.
TIM/TILAB, Blu, Mobilkom Austria, One2one, Telefonica: Re-intruduction of SIR measurement, 3GPP TSG-4RAN4 Meeting #17,3GPP, May 21, 2001, R4-010647, URL: http://www.3gpp.org/ftp/tsg_ran/WG4_Radio/TSGR4_17/Docs/R4-010647.Zip.
3GPP TSG RAN2#45bis. "EDCH Buffer Status Reporting," R2-050026, Sophia Antipolis, France, Jan. 10-14, 2005, URL: http://www.3gpp.org/ftp/tsg_ran/WG2_RL2/TSGR2_45bis/Dcs/R2-050026.zip.
3GPP TSG-RAN WG2 meeting #48. "Scheduling Information Contents," R2-051957, London, United Kingdom, Aug. 29, 2005, URL: http://3gpp.org/ftp/tsg_ran/WG2_RL2/TSGR2_48/Docments/R2-095517.zip.
Chang, Cheng-Ta: "Downlink Transmit Power Issues in a WCDMA Cellular System,"Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.
Gunnarsson, G. et al.,"Location Trial System for Mobile Phones," Global Telecommunications Conference, 1998. GLOBECOM 98. The Bridge to Global Integration. IEEE, vol. 4, pp. 2211-2216, Nov. 8-12, 1998.
Hobfeld, T. et al., "Supporting Vertical Handover by Using a Pastry Peer-to-Peer Overlay Network," Fourth Annual IEEE International Conference on Pervasive Computing and Communications Workshops, 2006. Percom Workshops 2006. Mar. 13-17, 2006, pp. 163-167, p. 164, paragraph III, IEEE, Piscataway, NJ, USA, XP010910514, ISBN: 0-7695-2520-2.
LG Electronics Inc., "Relative Buffer Status Reporting", 3GPP TSG-RAN WG2 meeting #46bis, R2-050852, Apr. 2005, pp. 1-3, URL, http://www.3gpp.org/ftp/tsg_ran/WG2_RL2/TSGR2_46bis/Documents/R2-050852.zip.
Samsung: "Uplink control signaling structure (Revision of R1-041086)," 3GPP TSG-RAN WG1 Meeting #38bis, Tdoc R1-041222, 3GPP, Sep. 20, 2004, URL: http://www.3gpp.org/ftp/tsg_ran/WG1_RL1/TSGR1_38bis/Dcs/R1-041222.zip.

* cited by examiner

| Bits (MSb:LSb) | Reported adjusted received power calculation, e.g., ratio of the downlink beacon channels, using loading factors |
|---|---|
| 0b0000 | -3 dB |
| 0b0001 | -2 dB |
| 0b0010 | 0 dB |
| 0b0011 | 1 dB |
| 0b0100 | 2 dB |
| 0b0101 | 3 dB |
| 0b0110 | 4 dB |
| 0b0111 | 6 dB |
| 0b1000 | 8 dB |
| 0b1001 | 10 dB |
| 0b1010 | 12 dB |
| 0b1011 | 14 dB |
| 0b1100 | 16 dB |
| 0b1101 | 20 dB |
| 0b1110 | 24 dB |
| 0b1111 | 26 dB |

METHODS AND APPARATUS FOR BROADCASTING LOADING INFORMATION CORRESPONDING TO NEIGHBORING BASE STATIONS

RELATED APPLICATIONS

This application is continuation-in-part of U.S. Ser. No. 11/251,069 filed Oct. 14, 2005, a continuation-in-part of U.S. patent application Ser. No. 11/302,709 filed Dec. 14, 2005, a continuation-in-part of U.S. patent application Ser. No. 11/486,714 filed Jul. 14, 2006 and a continuation-in-part of U.S. application Ser. No. 11/487,017 filed Jul. 14, 2006 each of which is hereby incorporated by reference.

FIELD OF THE INVENTION

The present invention relates to wireless communications systems and, more particularly, to method and apparatus for communicating, collecting, measuring, reporting and/or using information which can be used for interference control purposes and/or load management in a wireless communications system.

BACKGROUND

In a wireless multiple access communication system, wireless terminals contend for system resources in order to communicate with a common receiver over an uplink channel. An example of this situation is the uplink channel in a cellular wireless system, in which wireless terminals transmit to a base station receiver. When a wireless terminal transmits on the uplink channel, it typically causes interference to the entire system, e.g., neighboring base station receivers. Since wireless terminals are distributed, controlling the interference generated by their transmission is a challenging problem.

Many cellular wireless systems adopt simple strategies to control uplink interference. For example CDMA voice systems (e.g., IS-95) power control wireless terminals in such a manner that their signals are received at the base station receiver at approximately the same power. State-of-the-art CDMA systems such as 1xRTT and 12xEV-DO allow to wireless terminals to transmit at different rates, and be received at the base station at different powers. However, interference is controlled in a distributed manner which lowers the overall level of interference without precisely controlling those wireless terminals that are the worst sources of interference in the system.

Existing interference-control approaches can be useful but interference continues to limit the uplink capacity of wireless systems and new and/or improved interference control methods would be useful.

It would be useful if a base station could be provided with information that could be used in determining the amount of signal interference that will be created in neighboring cells and/or sectors when a transmission occurs and/or determining the amount of interference a wireless terminal is likely to encounter due to signal interference. It would be particularly desirable if information which can be used for interference determination purposes could be supplied by one or more wireless terminals to a base station.

Loading affects interference considerations in a wireless communications system. It would be beneficial if in some, but not necessarily all implementations, such information was available to wireless terminals and/or base stations. It could also be beneficial if wireless terminals and/or base stations were to utilize such loading information in determining interference levels. Accordingly, there is a need for new methods and/or apparatus for communicating and/or using loading interference information for interference control purposes.

A wireless terminal currently connected and synchronized with respect to one base station attachment point may be readably able to receive detailed characteristic information being broadcast from the base station to which it has a current connection; however, the wireless terminal may have difficulty recovering information from other, e.g., adjacent base stations. If a wireless terminal could be expected to be able to recover loading information about the base stations in its vicinity, such information could be used in a well controlled interference report. It would be beneficial if methods and apparatus facilitated the reliable delivery to such a wireless terminal of loading information from a plurality of base stations in its current vicinity.

Some communications systems may use a centralized control approach, e.g., using a core node, to manage interference and/or load balance; however, such an approach is subject to signaling and processing delays, and may limit the amount of information that can be reasonably communicated to the core node. Thus a core node approach used in some systems may tend to be sluggish or unable to quickly adapt to changing conditions resulting in efficient allocation resources.

In view of the above discussion, it should be appreciated that there is a need for improvements in communication of information which can be used in controlling interference and/or new and improved interference management techniques.

SUMMARY

Various embodiments are directed to methods and apparatus for communicating, collecting, measuring, reporting and/or using information which can be used for interference control purposes and/or loading management. Methods and apparatus are described where loading information regarding loading conditions at a neighboring base station is received at a base station and then used and/or communicated to mobile nodes within the cell in which the receiving base station is located. Thus, a base station may communicate information abut the loading at the particular base station as well as loading at neighboring base station, e.g., physically adjacent base stations. It is beneficial if a mobile node is able to reliably receive loading factor information corresponding to not only the base station to which it is attached but from other base stations in its current vicinity in the communications system so that it can take such loading into consideration when generating interference reports and/or making various decisions. Thus, information about loading at adjacent base stations can be used to improve interference control. For example, a mobile node, in various embodiments, generates uplink interference reports such as beacon ratio reports, as a function of received known signals, e.g., beacon and/or pilot channel signals, from its own base station and form other, e.g., adjacent base stations. The interference reports, in some embodiments, also utilize base station loading information, when available, to calculate more accurate reports. By improving the likelihood that a wireless terminal will be able to successfully recover and use adjacent base station loading information in generating an interference report, a more tightly controlled interference report is generated. As a result, interference and/or load management by a base station receiving such reports can be more efficient.

In accordance with various embodiments, a base station communicates its loading factor information to adjacent base stations, e.g., via a backhaul network. A base station receives communicated loading information from adjacent base stations and broadcasts its own loading factor as well as the loading factors corresponding to adjacent base stations. Thus loading factor information from a plurality of base stations in a local vicinity of the communications system is made readily available to a mobile node, facilitating improved interference control. This overcomes difficulties of a mobile node directly receiving such loading information from a base station other than the one with which it has a communications link. It should be appreciated that a mobile node in a wireless communication system may be currently connected and synchronized with respect to a first base station. Such a mobile node may be typically able to reliably receive broadcast information from that particular base station. However, such a mobile node may or may not be able to reliably recover broadcast information from an adjacent base station. For example, the wireless terminal may be able to detect and measure high power beacon signals but may be unable to recover other control information broadcast signals from an adjacent base station. By having base stations transmit information about the loading at neighboring base stations, in accordance with various embodiments, the problem of a mobile having to receive such information directly over the air from the neighboring base station is overcome.

An exemplary method of operating a first base station in a wireless communications system including a plurality of base stations, each base station including at least one base station attachment point, includes: receiving second base station loading factor information indicative of loading of a second base station attachment point corresponding to a second base station; and broadcasting at least some of said second base station loading factor information. An exemplary first base station for use in a multiple access wireless communications system including a plurality of base stations, each of said plurality of base station including at least one base station attachment point, includes: a first receiver for receiving second base station loading factor information indicative of loading of a second base station attachment point corresponding to a second base station; and a transmitter module for broadcasting at least some of said received second base station loading factor information.

While various embodiments have been discussed in the summary above, it should be appreciated that not necessarily all embodiments include the same features as some of the features described above are not necessary but can be desirable in some embodiments. Numerous additional features, embodiments and benefits of the present invention are discussed in the detailed description which follows.

DETAILED DESCRIPTION

Figure 1:
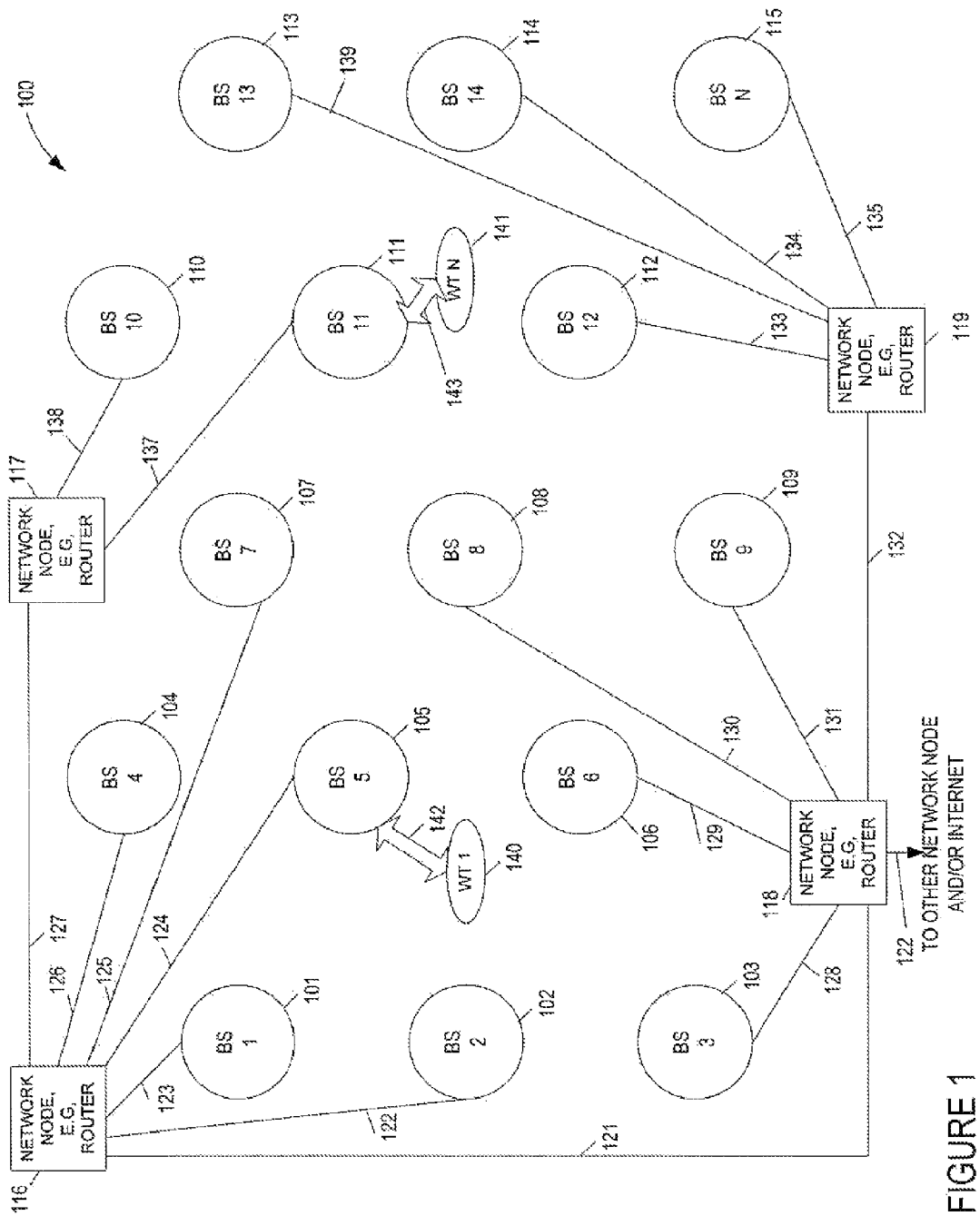
FIG. 1 is a drawing of an exemplary wireless communications system implemented in accordance with various embodiments.

FIG. 1 is a drawing of an exemplary wireless communications system, e.g., a multiple access orthogonal frequency division multiplexing (OFDM) wireless communications system. Exemplary communications system 100 includes a plurality of base stations (BS 1 101, BS 2 102, BS 3 103, BS 4 104, BS 5 105, BS 6 106, BS 7 107, BS 8 108, BS 9 109, BS 10 110, BS 11 111, BS 12 112, BS 13 113, BS 14 114, . . . , BS N 115). Each base station has a corresponding wireless coverage area, e.g., a cellular coverall area surrounding the base station. Cellular coverage area of adjacent base stations may, and generally do, overlap. The base stations of system 100 may be single sector base stations, multi-sector base stations, or a combination of some single sector base stations, multi-sector base stations. Each sector of a base station corresponds to at least one carrier and one downlink/uplink tone block pair. In addition each sector of a base station may, and sometimes does correspond to multiple carriers and/or multiple sets of downlink/uplink tone block pairs. Each downlink/uplink tone block pair being used by a base station sector corresponds to a base station attachment point.

The base stations (101, 102, 103, 104, 105, 106, 107, 108, 109, 110, 111, 112, 113, 114, 115) of system 100 are coupled together via a backhaul network. Exemplary system 100 also includes a plurality of network nodes, e.g., routers, (116, 117, 118, 119) which are coupled to the base stations. In system 100 network node 116 is coupled to (BS1 101, BS2 102, BS4 104, BS 5 105, BS 7 107, network node 117, network node 118) via network links (123, 122, 126, 124, 125, 127, 121), respectively. Network node 117 is coupled to (BS10 110, BS11 111), via network links (138, 137), respectively. Network node 118 is coupled to (BS3 103, BS6 106, BS8 108, BS9 109, network node 119) via network links (128, 129, 130, 131, 132), respectively. Network node 119 is coupled to (BS12 112, BS13 113, BS 14 114, BS N 115) via network links (133, 139, 134, 135, respectively. Network node 118 is also coupled to other network nodes and/or the Internet via network link 122 Network links (121, 122, 123, 124, 125,

126, 127, 128, 129, 130, 131, 132, 133, 134, 135, 137, 138, 139) may be, e.g., fiber optic links, wire links, and/or wireless links.

The wireless communications system 100 also includes a plurality of wireless terminals (WT 1 140, . . . , WT N 141), e.g., mobile nodes, which may move throughout the communications system and use a base station attachment point in a region in which it is currently located. In this example, WT 1 140 is shown being coupled to BS 5 105 via wireless link 142, and WT N 141 is shown being coupled to BS 11 111 via wireless link 143. It is to be understood that in general, each base station typically has a plurality of wireless terminals connected and using its attachment point or points. The current load on any given attachment point will typically change over time as a function of a number of factors including the number of wireless terminals using the attachment point and/or amount of data/information, e.g., traffic to be communicated.

Although two exemplary wireless terminals are shown in the system of FIG. 1, it is to be understood that system 100 generally includes a much larger number of wireless terminals concurrently operating and competing for air link resources, such as uplink traffic channel segments. The loading at a particular base station varies over time as a function of the number of wireless terminals currently using that base station to for network attachment, the type of such wireless terminals, the applications being used by such wireless terminals, and/or the current air link needs of such wireless terminals. For example, one base station may be heavily loaded due to a large number of concurrent users each using a small amount of uplink air link traffic channel segments per unit time, e.g., a large number of concurrent VoIP calls in process. Another base station may be heavily loaded by a small number of concurrent uses, but each user needing a large amount of air link resources per unit time, e.g., a small number of wireless terminals needing a large amount of uplink air link resources per unit time to send a digitized high resolution image stream signals. Still another base station may be lightly loaded, e.g., due to location and/or time of day and a very small number of concurrent users.

Figure 2:
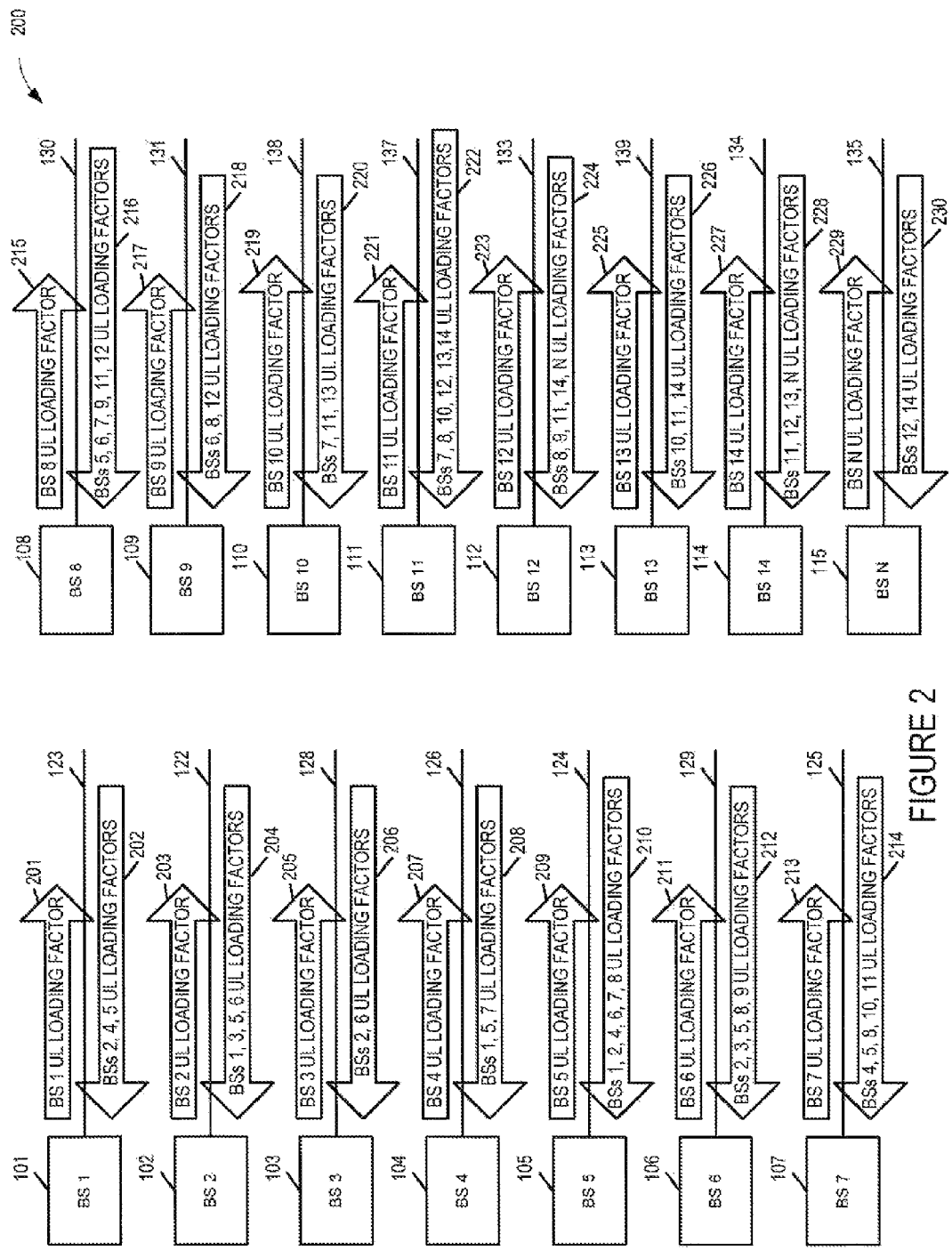
FIG. 2 is a drawing illustrating exemplary signaling including loading factor information being communicated from/to base stations over the backhaul network in accordance with various embodiments.

FIG. 2 is a drawing 200 illustrating exemplary signaling being communicated over the backhaul network in accordance with various embodiments. In accordance with various embodiments, at least some of the base stations in the system exchange loading information, e.g., uplink loading factor information, to facilitate improved interference management and better allocation of air link resources. In exemplary system 100 of FIG. 1, each base station communicates its own determined uplink loading factor to each of the adjacent base stations in the system 100, e.g., on an ongoing basis. In some embodiments, uplink loading factors may be communicated between base stations in accordance with a schedule, e.g., a recurring schedule. In some embodiments, uplink loading factors may be communicated between base station in response to a request or command, e.g., from/to another base station. In some embodiments, uplink loading factors may be communicated between base station in response to a condition occurring, e.g., a change in a determined loading factor or the determined loading factor exceeding a limit. In some embodiment, a base station may sent out its loading factor, e.g., to selected adjacent base stations, when it determines a high level of loading.

Base station 1 101 transmits its uplink loading factor via signals 201 and receives uplink loading factors corresponding to base stations 2, 4, and 5 via signals 202, the signals 201 and 202 being communicated via network link 123. Base station 2 102 transmits its uplink loading factor via signals 203 and receives uplink loading factors corresponding to base stations 1, 3, 5, and 6 via signals 204, the signals 203 and 204 being communicated via network link 122. Base station 3 103 transmits its uplink loading factor via signals 205 and receives uplink loading factors corresponding to base stations 2, and 6 via signals 206, the signals 205 and 206 being communicated via network link 128. Base station 4 104 transmits its uplink loading factor via signals 207 and receives uplink loading factors corresponding to base stations 1, 5, and 7 via signals 208, the signals 207 and 208 being communicated via network link 126. Base station 5 105 transits its uplink loading factor via signals 209 and receives uplink loading factors corresponding to base stations 1, 2, 4, 6, 7, and 8 via signals 210, the signals 209 and 210 being communicated via network link 124. Base station 6 106 transmits its uplink loading factor via signals 211 and receives uplink loading factors corresponding to base stations 2, 3, 5, 8 and 9 via signals 212, the signals 211 and 212 being communicated via network link 129. Base station 7 107 transmits its uplink loading factor via signals 213 and receives uplink loading factors corresponding to base stations 4, 5, 8, 10 and 11 via signals 214, the signals 213 and 214 being communicated via network link 125. Base station 8 108 transmits its uplink loading factor via signals 215 and receives uplink loading factors corresponding to base stations 5, 6, 7, 9, 11, and 12 via signals 216, the signals 215 and 216 being communicated via network link 130. Base station 9 109 transmits its uplink loading factor via signals 217 and receives uplink loading factors corresponding to base stations 6, 8, and 12 via signals 218, the signals 217 and 218 being communicated via network link 131. Base station 10 110 transmits its uplink loading factor via signals 219 and receives uplink loading factors corresponding to base stations 7, 11, and 13 via signals 220, the signals 219 and 220 being communicated via network link 138. Base station 11 111 transmits its uplink loading factor via signals 221 and receives uplink loading factors corresponding to base stations 7, 8, 10, 12, 13 and 14 via signals 222, the signals 221 and 222 being communicated via network link 137. Base station 12 112 transmits its uplink loading factor via signals 223 and receives uplink loading factors corresponding to base stations 8, 9, 11, 14 and N via signals 224, the signals 223 and 224 being communicated via network link 133. Base station 12 113 transmits its uplink loading factor via signals 225 and receives uplink loading factors corresponding to base stations 10, 11 and 14 via signals 226, the signals 225 and 226 being communicated via network line 139. Base station 14 114 transmits its uplink loading factor via signals 227 and receives uplink loading factors corresponding to base stations 11, 12, 13 and N via signals 228, the signals 227 and 228 being communicated via network link 134. Base station N 115 transmits its uplink loading factor via signals 229 and receives uplink loading factors corresponding to base stations 12 and 14 via signals 230, the signals 229 and 230 being communicated via network link 135. Note that a given base station and one of its adjacent base stations may or may not be connected through a single network router. For example, in FIG. 1, base stations 2 and 3 are connected with two different network routes, though the two base stations are adjacent and exchange loading information between them as shown in FIG. 2.

It is to be understood that signals conveying loading factors via the backhaul may include one or more loading factors. For example signals 202 may include separate signals, e.g., separate messages, for each of BS 2 loading factor, BS 4 loading factor, and base station 5 loading factor. Alternatively, signals 202 may include loading factors for BS 2, 4, and 5 in a single message.

Figure 3:
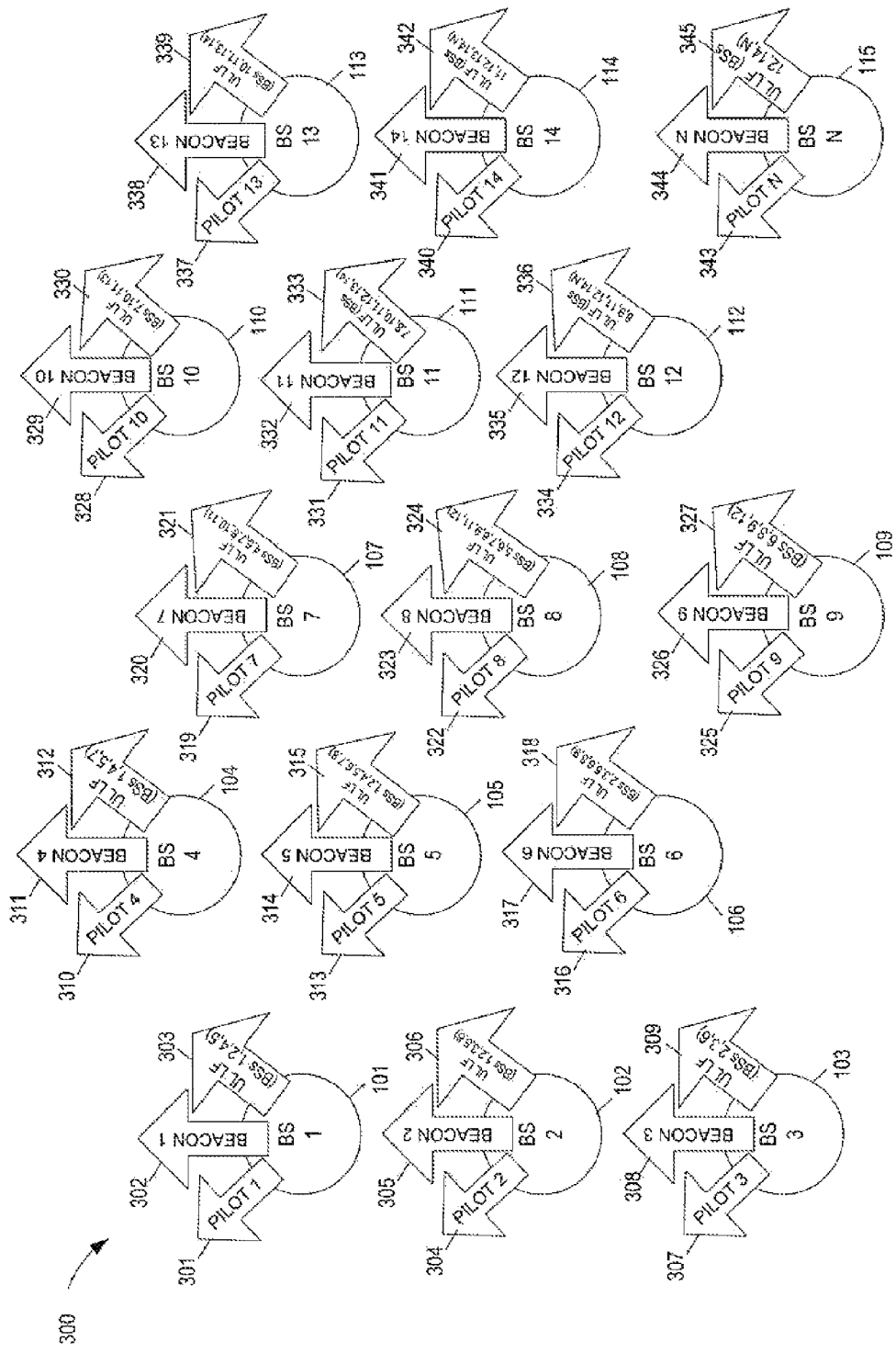
FIG. 3 is a drawing illustrating exemplary broadcast signaling being transmitted from the base stations of the system of FIG. 1 in accordance with various embodiments.

FIG. 3 is a drawing 300 illustrating exemplary broadcast signaling being transmitted from each of the base stations of system 100 of FIG. 1, e.g., in accordance with a recurring schedule. Operations of the base stations need nor be, and generally are not timing synchronized with respect to one another. For example, WT 1 140, which is currently connected to BS 5 105 as shown in FIG. 1 may not be timing synchronized with respect to other adjacent base stations such as base station 2 102 and base station 6 106. In the example of FIG. 3, each base station transmits broadcast signals including beacon signals, pilot channel signals, and uplink loading factor signals. The characteristics of the beacon signals are such to facilitate easy detection, even by wireless terminals which may not be precisely synchronized with the base station which transmitted the beacon signal and/or are experiencing poor channel conditions with respect to the base station transmitting the beacon signal. For example, the beacon signal is, in some embodiments, a relatively high power signal with a concentration of energy on one or a few tones and the width of the beacon signal is larger than a typical OFDM symbol signal, e.g., the beacon signal is two OFDM symbols wide with an initial symbol portion and an extension portion. Pilot signals are transmitted, in this embodiment, at a lower per tone power than the beacon signals, are transmitted more frequently than beacon signals and follow predetermined tone hopping patterns. Uplink loading factor broadcast signals are communicated as part of broadcast information signals. A single broadcast signal communicating uploading loading factor information may communicate one or more uplink loading factors. A wireless terminal timing synchronized with a base station's downlink signaling and having good channel conditions, e.g., a wireless terminal currently connected to a base station attachment point and experiencing good channel conditions, should be able to recover the uplink loading factor broadcast signals. However, a wireless terminal using an adjacent base station attachment point may or may not be able to successfully recover the broadcast uplink loading factor signals from a base station to which it is not currently connected, even though it may be able to recover and evaluate beacon signals and/or pilot channel signals.

In accordance with a feature of various embodiments, a base station broadcasts its own uplink loading factor and uplink loading factors corresponding to other, e.g., adjacent, base stations. Thus a wireless terminal need not have to rely on attempting to recover uplink loading factors from base stations to which it is not currently connected. Thus, wireless terminals can be more likely to receive current uplink loading factor information corresponding to the various base stations in its current location, and can use such information to generate more useful uplink interference reports, e.g., more precise beacon ratio reports. For example, if the wireless terminal were able to receive the loading factor corresponding to its current point of network attachment, but were not able to receive a loading factor corresponding to an adjacent base station, the wireless terminal might have to use a default value for the unrecovered uplink loading in calculating a beacon ratio report. The default factor might typically be chosen to take a conservative approach, thus the interference report might potentially higher interference than would actually be generated. However, if the wireless terminal were able to obtain each of the loading factors needed for the interference report, a better and more controlled interference report could be generated and communicated to the base station for better interference management and more efficient allocating of air link resources by the base station.

Base station 1 101 broadcasts beacon signals 302, pilot signals 301, and signals 303 conveying uplink loading factors corresponding to base stations 1, 2, 4, and 5. Base station 2 102 broadcasts beacon signals 305, pilot signals 304, and signals 306 conveying uplink loading factors corresponding to base stations 1, 2, 3, 5 and 6. Base station 3 103 broadcasts beacon signals 308, pilot signals 307, and signals 309 conveying uplink loading factors corresponding to base stations 2, 3, and 6. Base station 4 104 broadcasts beacon signals 311, pilot signals 310, and signals 312 conveying uplink loading factors corresponding to base stations 1, 4, 5, and 7. Base station 5 105 broadcasts beacon signals 314, pilot signals 313, and signals 315 conveying uplink loading factors corresponding to base stations 1, 2, 4, 5, 6, 7 and 8. Base station 6 106 broadcasts beacon signals 317, pilot signals 316, and signals 317 conveying uplink loading factors corresponding to base stations 2, 3, 5, 6, 8 and 9. Base station 7 107 broadcasts beacon signals 320, pilot signals 319, and signals 321 conveying uplink loading factors corresponding to base stations 4, 5, 7, 8, 10 and 11. Base station 8 108 broadcasts beacon signals 323, pilot signals 322, and signals 324 conveying uplink loading factors corresponding to base stations 5, 6, 7, 8, 9, 11 and 12. Base station 9 109 broadcasts beacon signals 326, pilot signals 325, and signals 327 conveying uplink loading factors corresponding to base stations 7, 8, 9, and 12. Base station 10 110 broadcasts beacon signals 329, pilot signals 328, and signals 330 conveying uplink loading factors corresponding to base stations 7, 10, 11, and 13. Base station 11 111 broadcasts beacon signals 332, pilot signals 331, and signals 333 conveying uplink loading factors corresponding to base stations 7, 8, 10, 11, 12, 13 and 14. Base station 12 112 broadcasts beacon signals 335, pilot signals 334, and signals 336 conveying uplink loading factors corresponding to base stations 8, 9, 11, 14 and N. Base station 13 113 broadcasts beacon signals 338, pilot signals 337, and signals 339 conveying uplink loading factors corresponding to base stations 10, 11, 13, and 14. Base station 14 114 broadcasts beacon signals 331, pilot signals 330, and signals 332 conveying uplink loading factors corresponding to base stations 11, 12, 13, 14, and N. Base station N 115 broadcasts beacon signals 344, pilot signals 343, and signals 345 conveying uplink loading factors corresponding to base stations 12, 14, and N.

Figure 4:
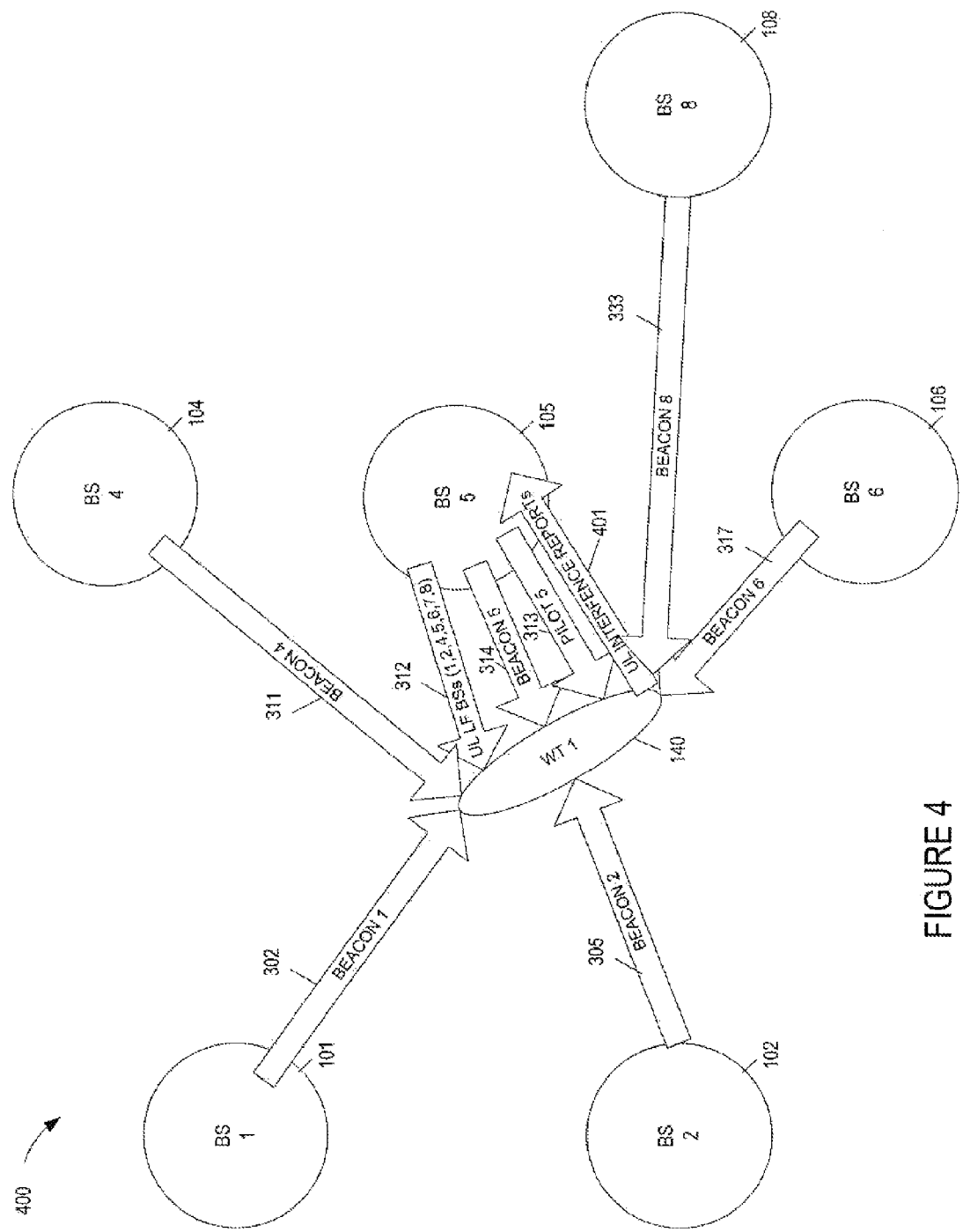
FIG. 4 is a drawing illustrating exemplary wireless terminal interaction with various base stations in its vicinity in regard to exemplary uplink interference reports in accordance with various embodiments.

FIG. 4 is a drawing 400 illustrating exemplary wireless terminal 1 140 interaction with various base stations in its vicinity. Wireless terminal 1 140 is currently connected to base station 5 105 which it is using as its point of network attachment. Wireless terminal 1 140 is currently an On state active user with respect to base station 5 105, is timing synchronized with respect to base station 5 105, has been allocated an On state identifier by base station 5 105, and has been allocated uplink dedicated control channel segments over which to communicate control information reports to base station 5 105. The control channel reports to be communicated to base station 5 105 include uplink interference reports, e.g., beacon ratio reports. Various interference reports, e.g., beacon ratio reports, compare the received power level of signals from the current attachment point to the received power levels of signals from one or more other, e.g., adjacent, base stations, and the reports also, in some embodiments, include uplink loading factor values, e.g., gain adjustment values to take into consideration the loading levels of the base stations.

Wireless terminal 1 104 receives beacon signals (302, 305, 311, 314, 317, and 323) from base stations (BS1 101, BS2 102, BS4 104, BS5 105, BS6 106, BS8 108), respectively. Due to the nature of the beacon signals, the wireless terminal is able to obtain a received power measurement level determination for each of base stations (101, 102, 104, 105, 106 and 108) even though the wireless terminal is not precisely synchronized with base station 1, 2, 4, 6, and 8. The wireless terminal 140 also receives and evaluates pilot channel signals 313 from base station 5 105. In addition the wireless terminal 140 receives uplink loading factor information corresponding to base stations (1, 2, 4, 5, 6, 7, and 8) from broadcast information signals 312 from base station 105.

The wireless terminal, uses received information to generate uplink interference report, e.g., various types of beacon ratio reports, which are communicated via uplink signals to base station 5 105. Base station 5 105 uses the received uplink interference reports in managing overall interference, making scheduling decisions, determining maximum uplink data rates, determining uplink power control information, and/or making handoff decisions. In addition, the uplink loading factor information determined by the base station 5 105 and/or the uplink loading factor information received by base station 5 via the backhaul network is, in some embodiments, used directly by base station 105 as an input in making various scheduling, control, and/or handoff decisions decisions.

One type of exemplary beacon ratio report is, in some embodiments, a specific beacon ratio report, comparing the current attachment point base station to another, e.g., a selected adjacent base station. For example, base station 5 105 may transmit a specific beacon ratio report comparing BS 5 105 to BS 6 106. Under such conditions, the wireless terminal 140 uses received beacon signal 317 measurement information, at least one received beacon signal 315 measurement information and received pilot channel signal 313 measurement information, and uplink loading factor information corresponding to base 5 and base station 6 received in signals 312 in determining an uplink interference report.

Another type of exemplary beacon ratio report is, in some embodiments, a generic beacon ratio report, comparing the current attachment point base station to a composite of other base station broadcast signals which are detected. For example, base station 5 105 may transmit a generic beacon ratio report comparing BS 5 105 to a composite of information from BS 1 101, BS 2 102, BS 4 104, BS 5 105, BS 6 106 and BS 8 108. Under such conditions, the wireless terminal 1 140 uses received beacon signals 302 measurement information, received beacon signals 305 measurement information, received beacon signals 311 measurement information, received beacon signals 317 measurement information, received beacon signals 323 measurement information, at least one of received beacon signal 314 measurement information and received pilot channel signal 313 measurement information, and uplink loading factor information corresponding to base stations 1, 2, 4, 5, 6, 8 received in signals 312 in determining an uplink interference report.

Figure 5:
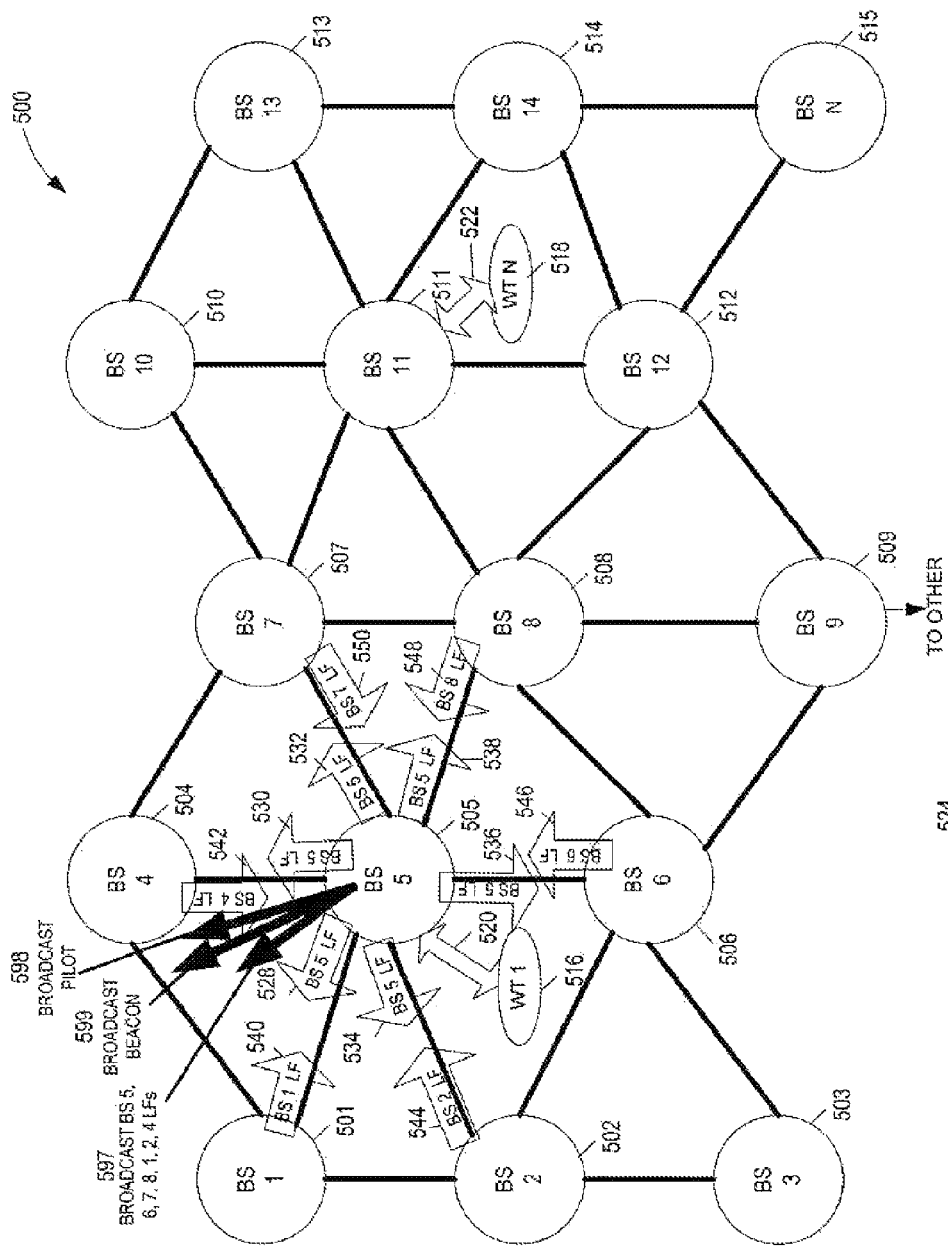
FIG. 5 is a drawing of an exemplary wireless communications system in accordance with various embodiments, illustrating the exchange of base station loading factor information between adjacent base stations via the backhaul.

FIG. 5 is a drawing of an exemplary wireless communications system 500, e.g., an OFDM communications system, illustrating the communication of base station loading factor information, e.g., uplink loading factor information, between base stations via a backhaul network and illustrating an exemplary base station broadcasting its own loading factor information and loading factor information corresponding to other, e.g., adjacent base stations. Exemplary system 500 includes a plurality of base stations (BS 1 501, BS 2 502, BS 3 503, BS 4 504, BS 5 505, BS 6 506, BS 7 507, BS 8 508, BS 9 509, BS 10 510, BS 11 511, BS 12 512, BS 13 513, BS 14 514, and BS N 515 coupled together and coupled to other network nodes via a backhaul network as shown in FIG. 5. Legend 524 indicates that solid lines 526 in FIG. 5 represent backhaul network infrastructure, e.g., network links.

System 500 includes a plurality of wireless terminals (wireless terminal 1 516, . . . , wireless terminal N 518). The wireless terminals may be distributed through the system 500 with base station loading, e.g., base station attachment point uplink loading, varying across the system. For a given base station, the base station determines its own base station attachment point loading.

Wireless terminal 1 516 is currently connected to BS 5 505 via wireless link 520, while wireless terminal 518 is currently coupled to base station 11 511 via wireless link 522. Base station 5 505 transmits its loading factor to its adjacent base stations (BS 1 502, BS 2 502, BS 4 504, BS 6 506, BS 7 507, BS 8 508) via signals (528, 534, 530, 536, 532, 538), respectively, via the backhaul network. Base station 5 505 receives loading factor information from (BS 1 502, BS 2 502, BS 4 504, BS 6 506, BS 7, BS 8 508) corresponding to (BS 1 502, BS 2 502, BS 4 504, BS 6 506, BS 7 507, BS 8 508) via signals (540, 544, 542, 546, 550, 548), respectively, via the backhaul network. Base station 5 505 transmits broadcast beacon signals 599, broadcast pilot channel signals 598, and broadcast loading factor information corresponding to base stations 5, 6, 7, 8, 1, 2, and 4 via broadcast signals 597. Thus, a wireless terminal connected to BS 5, e.g., WT 1 516, can recover the loading factor information corresponding to adjacent base stations of interest via received broadcast signals 597. For example, wireless terminal 1 516 may recover and use the uplink loading factor information corresponding to base station 5 505, base station 2 502 and base station 6 506 in various uplink interference reports, e.g., beacon ratio reports communicated to base station 5. Note that a base station may send its loading information to its adjacent base stations when the base station experiences a high level of loading but may or may not send such information at other times. Moreover, a base station may limit broadcasts of adjacent base station loading factors to loading factors of those adjacent base stations that are experiencing a high level of loading, e.g., to reduce the amount of overhead in the broadcast channel as compared to implementations where loading factors are transmitted regardless of the amount of base station loading indicated by the loading factor. Alternatively, a base station may transmit loading factor information corresponding to highly loaded adjacent base stations at a higher rate, e.g., frequency, than for lightly loaded adjacent base stations. In such implementations, if the terminal does not receive the loading factor of one particular adjacent base station from the base station to which it is attached, the terminal can assume that the adjacent base station is lightly loaded, and therefore use a first default value of the loading factor for the adjacent base station when the terminal is calculating the interference report, e.g., a beacon ratio report. The first default value can be set to represent that the adjacent base station is lightly loaded. It should be pointed out that in a communication system in which the loading information of neighboring base stations is not broadcast, if the wireless terminal cannot recover the loading information from the adjacent base station, the wireless terminal can not use the failure to receive loading factor information corresponding to a base station to which it is not attached as an indicator that the base station for which loading factor information is not received is lightly loaded. In some such implementations the wireless terminal uses a different, e.g., second, default value for the uplink loading factor which was not received when calculating a beacon ratio report than the default value used in the system where the loading factor information is broadcast for heavily loaded adjacent base stations but not others. This second default factor might typically be chosen to take a conservative approach, e.g., assuming the adjacent base station is not lightly loaded since the failure to receive base station loading factor information can not be interpreted as an indicator of light loading in such a case. Thus, the first and the second loading factor default values, corresponding to whether or not loading factor information for heavily loaded adjacent base stations is normally transmitted by a base station, will be different.

Figure 6:
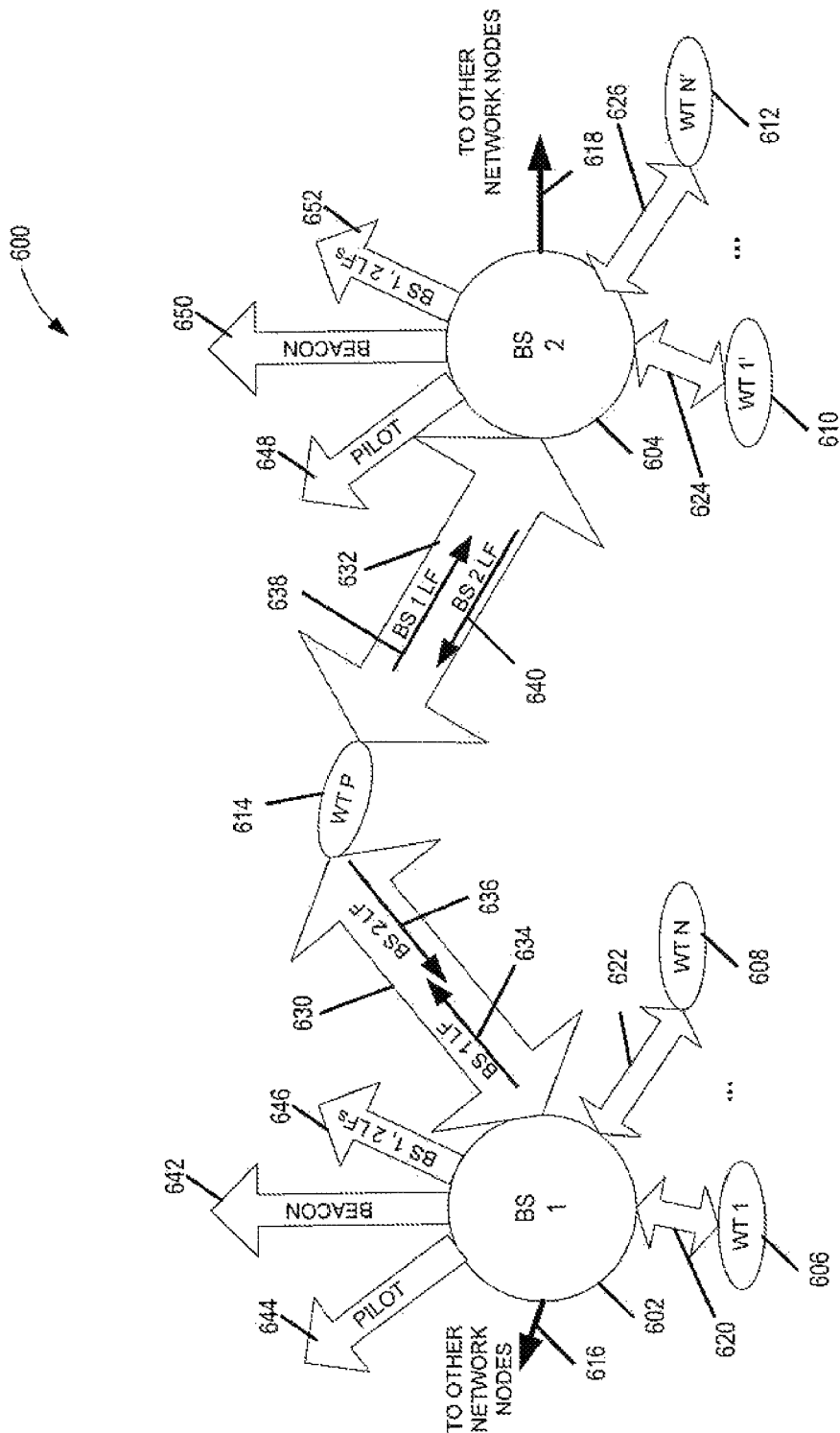
FIG. 6 is a drawing of an exemplary wireless communications system in accordance with various embodiments, illustrating the exchange of base station loading factor information between adjacent base stations with an exemplary wireless terminal which is connected to both base stations providing a communications path.

FIG. 6 is a drawing of an exemplary wireless communications system 600 in accordance with various embodiments, illustrating the exchange of base station loading factor information between adjacent base stations with an exemplary wireless terminal, which is connected to both base stations, providing a wireless communications path for the transfer of base station loading factor information. Exemplary wireless communications system 600, e.g., an OFDM communications system, includes a plurality of base stations including base station 1 602 and base station 2 604 coupled together to other network node, e.g., via network links 616, 618 and/or other network nodes and/or links.

Exemplary communications system 600 includes a plurality of wireless terminals, e.g., mobile nodes, which may move throughout the system and attach to a base station in whose coverage area, e.g., cell, it is situated. In exemplary communications system 600 at least some of the wireless terminals support concurrent connections with two base station attachment points. Exemplary wireless terminal P 614 is one such wireless terminal which is shown coupled to BS 1 601 via first wireless link 630 and coupled to BS 2 604 via second wireless link 632. Note that for the sake of description, wireless terminal P 614 is connected with the two base stations concurrently in this figure. However, it is also possible that wireless terminal P 614 is connected with the two base stations at different time instants. For example, wireless terminal P 614 may be first connected with base station 1 and then drop the connection and handoff to base station 2. After wireless terminal P 614 is connected with base station 2, wireless terminal P 614 nay inform base station 2 the loading information of base station 1. Additional wireless terminals (WT 1 606, . . . , WT N 608) are coupled to BS 1 602 via wireless links (620, . . . , 622), respectively. Additional wireless terminals (WT 1' 610, . . . , WT N' 612) are coupled to BS 2 604 via wireless links (624, . . . , 626), respectively.

BS 1 602 determines its own loading factor and communicates the value in a message 634 transmitted to WT P 614, which in turn generates and transmits message 638 to BS 2 604. BS 2 604 determines its own loading factor and communicates the value in a message 640 transmitted to WT P 614, which in turn generates and transmits message 636 to BS 1 604. Alternatively, WT P can recover the BS 1 loading factor from a base station 1 broadcast signal 646 and transmit that value to base station 2 604 in signal 638, e.g., in response to a command from base station 1, a request from base station 2, or a predetermined schedule, or in response to a detected condition such as a change in the base station 1 loading factor or the recognition that BS 2 is broadcasting stale information regarding BS 1 loading. Similarly, WT P can recover the BS 2 loading factor from a base station 2 broadcast signal 652 and transmit the value to base station 1 602 in signal 636, e.g., in response to a command from base station 2, a request from base station 1, or a predetermined schedule, or in response to a detected condition such as a change in the base station 2 loading factor or the recognition that BS 1 is broadcasting stale information regarding BS 2 loading.

Base station 1 602 transmits broadcast beacon signals 642, broadcast pilot channel signals 644, and broadcast loading factor signals 646, e.g., uplink loading factors, corresponding to base station 1 and base station 2. Base station 2 604 transmits broadcast beacon signals 650, broadcast pilot channel signals 648, and broadcast loading factor signals 652, e.g., uplink loading factors, corresponding to base station 1 and base station 2.

WTs which are currently connected to BS 1 602, but not to BS 2 604, e.g. WT 1 606, receive and measure the high power easily detectable beacon signal 650 from BS 2 604, the beacon signal 642 from BS 1 602 and the pilot channel signal 644 from BS 1 602. WT 1 606 uses the uplink loading factor information corresponding to BS 1 and BS 2 recovered from broadcast signals 646, the measurement of the received strength of beacon 650, and at least one of the received strength of beacon 642 and pilot 644 in determining an interference report, e.g., a beacon ratio report. The determined interference report is then communicated to BS 602 via dedicated control channel segment signals using wireless link 620.

WTs which are currently connected to BS 2 604, but not to BS 1 602, e.g. WT 1' 610, receive and measure the high power easily detectable beacon signal 642 from BS 1 602, the beacon signal 650 from BS 2 604, and the pilot channel signal 648 from BS 2 604. WT 1' 610 uses the uplink loading factor information corresponding to BS 1 and BS 2 recovered from broadcast signals 652, the measurement of the received strength of beacon 642, and at least one of the received strength of beacon 650 and pilot 648 in determining an interference report, e.g., a beacon ratio report. The determined interference report is then communicated to BS 2 604 via dedicated control channel segment signals using wireless link 624.

Figure 7:
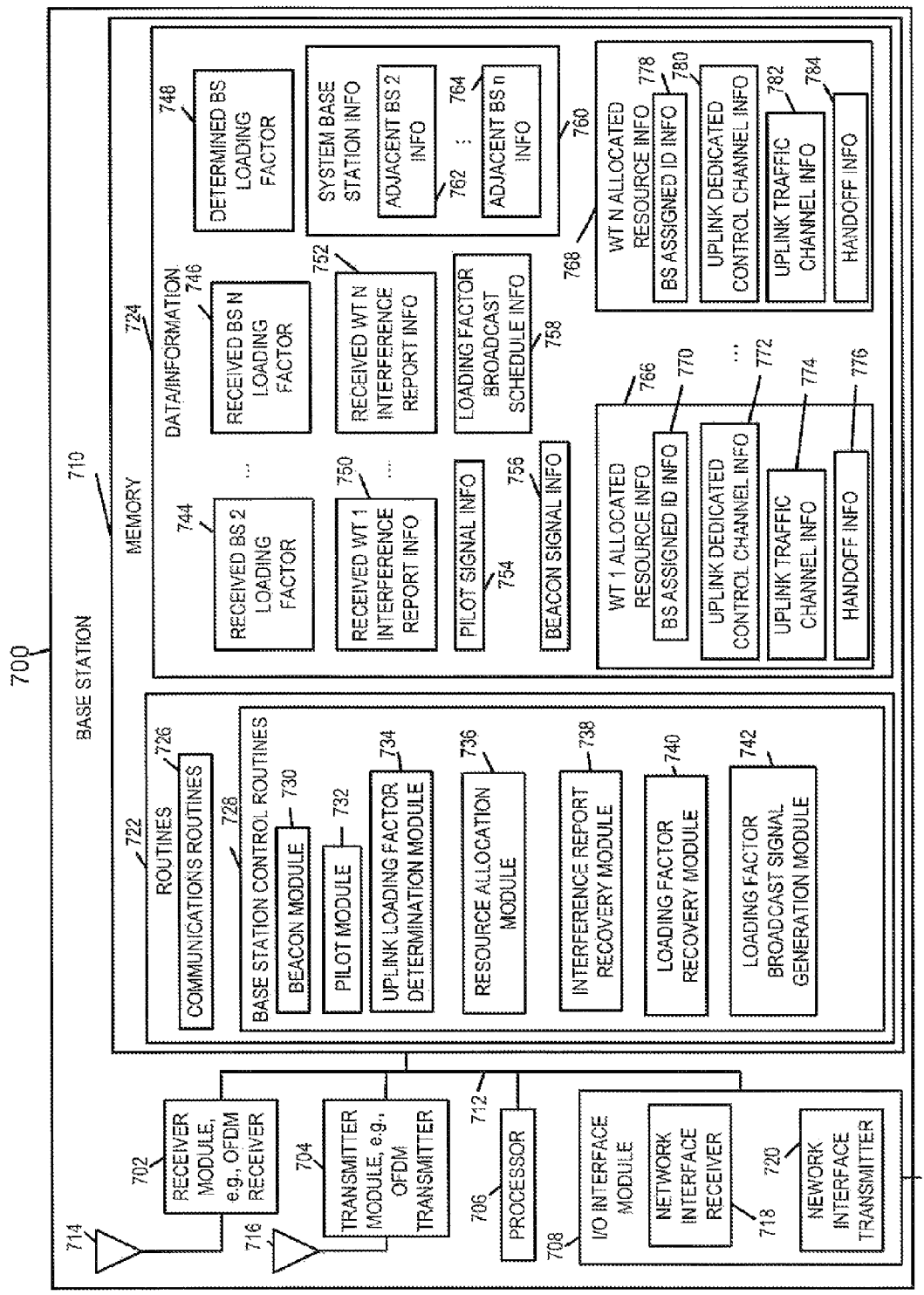
FIG. 7 is a drawing of an exemplary base station in accordance with various embodiments.

FIG. 7 is a drawing of an exemplary base station 700 implemented in accordance with various embodiments. Exemplary base station 700 may be any of the base stations of system 100 of FIG. 1, system 500 of FIG. 5 or system 600 of FIG. 6. Base station 700 may be used in a multiple access wireless communication system including a plurality of base stations, each of the plurality of base stations including at least one base station attachment point. In some embodiments, base station 700 includes a plurality of sectors. In some embodiments, base station 700 uses a plurality of different carriers. For example, a given sector/carrier combination may correspond to a base station attachment point. Exemplary base station 700 includes a receiver module 702, a transmitter module 704, a processor 706, an I/O interface module 708 and memory 710 coupled together via a bus 712 over which the various elements interchange data and information.

Receiver module 702, e.g., an OFDM receiver, is coupled to receive antenna 714 via which the base station receives uplink signals from wireless terminals. Uplink signals include access signals, timing control signals, power control signals, traffic channel signals and dedicated control channel signals. In some embodiments, uplink signals include base station loading factor information corresponding to other base stations, e.g., with the wireless terminal transmitting the information serving as a relay. For example, the base station 700, in some embodiments, receives base station loading factor information corresponding to an attachment point of a physically adjacent base station, from a mobile communications device which received the adjacent base station loading factor information over a wireless communications link with the adjacent base station. For example, the mobile communications device may be maintaining two wireless communications links concurrently and may serve as a relay between two adjacent base stations. Dedicated control channel signals include interference reports such as beacon ratio reports using uploading factor information. For example, consider that first and second wireless terminals are using the same base station 700 attachment point, wireless receiver module 702 receives from the first wireless terminal a first uplink interference report and from a second wireless terminal a second uplink interference report.

Transmitter module 704, e.g., an OFDM transmitter, is coupled to transmit antenna 716 via which the base station 700 transmits downlink signals to wireless terminals. The downlink signals include various broadcast signals such as beacon signals and/or pilot channel signals used for identification and/or to measure communication channels. The downlink signals also include broadcast channel signals including uplink loading factor information corresponding to base station 700 and corresponding to other, e.g., adjacent, base stations. Some of broadcast signals transmitted by transmitter module 704 include received base station loading factor information corresponding to other base stations. The downlink signals also include control signals and traffic channel segment signals.

I/O interface module 708 couples the base station to other network nodes, e.g., other base stations, and/or the Internet. Thus I/O interface module 708 facilitates the exchange of loading factor information between base station 700 and other, e.g., adjacent base stations, via a backhaul network. I/O interface module 708 includes a network interface receiver 718 and a network interface transmitter 720. Base station 700 receives via network interface receiver 718 physically adjacent base station loading factor information via a backhaul link between the base station 700 and the other base station to which the receiver 718 is coupled. Base station 700 transmits, e.g., to other adjacent base stations, determined uplink loading factor information corresponding to its own attachment point or points via network interface transmitter 720. Base station 700 receives uplink loading factor information corresponding to attachment point of other, e.g., adjacent, base stations via network interface receiver 718. I/O interface module 708 also allows a wireless terminal using a base station 700 attachment point to participate in a communications session with another wireless terminal using an attachment point of a different base station.

Memory 710 includes routines 722 and data/information 724. The processor 706, e.g., a CPU, executes the routines 722 and uses the data/information 724 in memory 710 to control the operation of the base station 700 and implements steps of methods. Routines 722 include communications routines 726 and base station control routines 728. The communications routines 726 implement the various communications protocols used by the base station 700. Base station control routines 728 include a beacon module 730, a pilot module 732, an uplink loading factor determination module 734, a resource allocation module 736, an interface report recovery module 738, a loading factor recovery module 740, and a loading factor broadcast signal generating module 742.

Beacon module 730 uses data/information 724 including beacon signal information 756 to control the generation and the transmission of beacon signals to be broadcast. Pilot signal module 732 uses the data/information 724 including the pilot signal information 754 to control the generation and transmission of pilot channel signals to be broadcast. Uplink loading factor determination module 734 determines uplink loading factors indicative of uplink loading for one or more attachment points of base station 700. For example uplink loading factor determination module 734 determines determined base station loading factor 748.

Resource allocation module 738 allocates uplink resources as a function of received uplink interference report information, e.g., received first and second uplink interference reports. The received uplink interference reports are, in some embodiments, a function of transmitted loading factor information corresponding to a base station attachment point base station 700 and a base station attachment point of another, e.g., an adjacent base station. In some embodiments, a first interference report from a first wireless terminal is a function of received power level measured by the first wireless terminal of a broadcast signal such as a beacon or pilot channel signal from base station 700, a first uplink loading factor corresponding to an attachment point of base station 700, a received power level measurement by the first wireless terminal of a broadcast signal such as a beacon or pilot channel signal from another, e.g., adjacent, base station, and a second uplink loading factor corresponding to an attachment point of said another base station.

Interference report recovery module 738 recovers uplink interference reports, e.g., beacon ratio reports, communicated from wireless terminals, using a base station 700 attachment point. Received WT 1 interference report information 750 and received wireless terminal N interference report information 752 represents information output from interference report recovery module 738 and utilized as input by resource allocation module 736.

Loading factor recovery module 740 recovers loading factors corresponding to other, e.g., adjacent, base stations communicated via messages through network interface receiver 718 and/or wireless receiver module 702. Received base station 2 loading factor 744 and received base station N loading factor N 746 represent output from loading factor recovery module 740.

Loading factor broadcast signal generation module 742 control the generation and broadcast of signals via transmitter 704 conveying one or more loading factors, e.g., one or more of base station 2 loading factor 744, base station N loading factor 746, and determined base station loading factor 748. In some embodiments, where base station 700 includes multiple sectors and/or uses multiple carriers, loading factor broadcast signal generation module selectively broadcast for a given attachment point relevant loading factor information while refraining from transmitting other stored loading factor information. For example, wireless terminals using a particular base station attachment point of a sector may not concerned with uplink loading factor information corresponding to some other attachment points due to a different carrier being used and/or the direction of coverage of an adjacent base station sector.

Data/information 724 includes received loading factors corresponding to a plurality of base station attachment points of other base stations (received base station 2 loading factor 744, . . . , received base station N loading factor 746), a determined base station loading factor 748 corresponding to a BS 700 attachment point, a plurality of interference report information (received WT 1 interference report information 750, . . . , WT N received interference report information 752), pilot signal information 754, beacon signal information 756, loading factor broadcast schedule information 758, and system base station information 760. System base station information 760 includes information corresponding to a plurality of adjacent base stations (adjacent base station 2 information 762, . . . , adjacent base station in information 764). Data/information 724 also includes a plurality of sets of WT allocated resource information (WT 1 allocated resource information 766, . . . , WT N allocated resource information 768). WT 1 allocated resource information 766 includes base station assigned identification information 770, uplink dedicated control channel information 772, uplink traffic channel segment information 774, and handoff information 776. WT N allocated resource information 768 includes base station assigned identification information 778, uplink dedicated control channel information 780, uplink traffic channel segment information 782, and handoff information 784.

Received base station 2 loading factor 744 and received base station N loading factor 746 are outputs of loading factor recovery module 740 while determined base station loading factor 748 is an output of determination module 734. Information describing, for an exemplary embodiment, exemplary uplink loading factors and corresponding values to represent the loading factor information is included in table 900 of FIG. 9.

Received WT 1 interference report information 750 and received WT N interference report information 752, e.g., beacon ratio report information, are outputs of interference report recovery module 738. Information describing, for an exemplary embodiment an exemplary format for a beacon ratio report is illustrated in table 1000 of FIG. 10.

Pilot signal information 754 includes information identifying air link resources, e.g., OFDM tone-symbols, in a recurring downlink channel structure, on which pilot signals are to be broadcast and power level information corresponding to the pilot tone signals. Beacon signal information 756 includes information identifying which air link resources, e.g., OFDM tone-symbols, are to be used to convey beacon signals and power levels associated with beacon signals. In some embodiments, a beacon signal is broadcast at a higher per tone power level than other types of downlink signals, is a narrowband signal, e.g., occupying one or a few tones with a high energy concentration, and has a duration exceeding an OFDM symbol transmission time period, thus facilitating easy detection, by wireless terminal which may or may not be synchronized with respect to the transmitter of the beacon signal.

Loading factor broadcast schedule information 758 includes information identifying when base station 700 should broadcast particular uplink loading factors corresponding to its own attachment point or points and attachment points of other, e.g., adjacent base stations. Loading factor broadcast schedule information 758 is used by loading factor broadcast signal generation module 742. In some embodiments, predetermined loading factor broadcast schedules, known to the base station 700 and wireless terminals, are utilized, thus eliminating the need for the inclusion of at least some base station attachment point identification information in the broadcast signaling and thus reducing signaling overhead.

Adjacent base station 2 information 762 includes base station 2 identification information, information identifying which carriers are used by base station 2, information associating particular attachment points of base station 2 with particular attachment point of base station 700 in terms of concern for uplink interference and whether of not a particular received BS 2 uplink loading factor corresponding to a base station 2 attachment point should be broadcast to wireless terminals using a particular base station 700 attachment point.

WT 1 allocated resource information 766 includes information determined by resource allocation module 736. Base station assigned identification information 770 includes, e.g., a base station 700 temporarily assigned On state identifier. Uplink dedicated control channel information 772 includes information identifying which dedicated control channel segments have been allocated to WT 1 for communicating uplink control information reports at least some of the reports being uplink interference reports, e.g., in accordance with predetermined mapping information. Uplink traffic channel information 774 includes information identifying which uplink traffic channel segments, e.g., in a predetermined uplink channel structure, have been allocated WT 1. Handoff information 776 includes handoff initiation signaling information to be directed to WT 1, e.g., in response to uplink loading considerations by resource allocation module 734.

Figure 8:
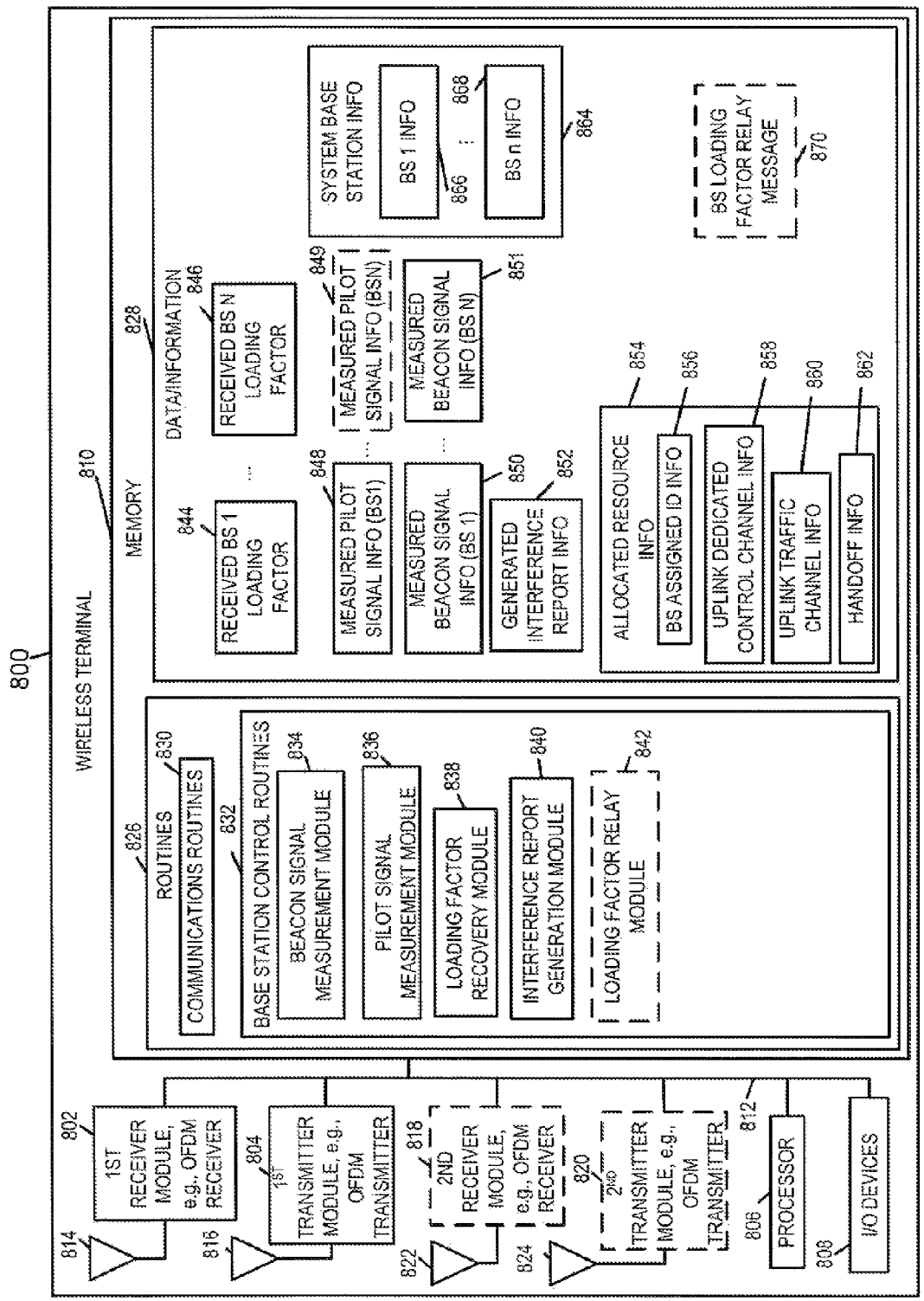
FIG. 8 is a drawing of an exemplary wireless terminal in accordance with various embodiments.

FIG. 8 is a drawing of an exemplary wireless terminal 800, e.g., mobile node, in accordance with various embodiments. Exemplary wireless terminal 800 includes a $1^{st}$ receiver module 802, a $1^{st}$ transmitter module 804, a processor 806, I/O devices 808, and a memory 810 coupled together via a bus 812 over which the various elements may interchange data information. In some embodiments, e.g., some embodiments supporting concurrent wireless communications links with at least two different base station attachment points, wireless terminal 800 also includes $2^{nd}$ receiver module 818 and a $2^{nd}$ transmitter module 820 coupled to bus 812.

$1^{st}$ receiver module 802, e.g., an OFDM receiver, is coupled to receive antenna 814 via which the wireless terminal 800 receives downlink signals from base stations. The downlink signals include broadcast beacon signals, broadcast pilot channel signals, and broadcast uplink loading factor signals conveying uplink loading factor information corresponding to an attachment point or points of the base station which broadcast the signal and uplink loading factor information corresponding to an attachment point or point of other base stations, e.g., base stations adjacent to the base station which transmitted the broadcast loading factor signals being received. Downlink signals also include resource allocation signals, e.g., signals conveying base station assigned wireless terminal identifiers, signals conveying traffic channel segment assignments and signals conveying dedicated control channel assignment information. In some embodiments, downlink signals include messages directed to WT 800 communicating base station attachment point loading information such that WT 800 can relay the information to another adjacent base station to which WT 800 is also connected. In some embodiments, downlink signals include at least one of a request to transfer loading factor information and a command to transfer loading factor information.

$1^{st}$ transmitter module 804, e.g., an OFDM transmitter, is coupled to transmit antenna 816 via which the wireless terminal 800 transmits uplink signals to base stations. In some embodiments, the same antenna is used for receiver module 802 and transmitter module 804, e.g., in conjunction with a duplex module. The uplink signals include dedicated control channel reports including interference reports, e.g., beacon ratio reports using dedicated control channel segments allocated to the wireless terminal, uplink traffic channel segment signals, access signals, power control signals, timing control signals, and handoff signals. In some embodiments, the uplink signals also include messages conveying uplink loading factor information corresponding to a base station attachment point, e.g., with the wireless terminal acting as relay between two base stations.

$2^{nd}$ receiver module 818, e.g., an OFDM receiver, is coupled to receive antenna 822 via which the wireless terminal 800 receives downlink signals from base stations. The downlink signals include broadcast beacon signals, broadcast pilot channel signals, and broadcast uplink loading factor signals conveying uplink loading factor information corresponding to an attachment point or points of the base station which broadcast the signal and uplink loading factor information corresponding to an attachment point or points of other base stations, e.g., base stations adjacent to the base station which transmitted the broadcast loading factor signals being received. Downlink signals also include resource allocation signals, e.g., signals conveying base station assigned wireless terminal identifiers, signals conveying traffic channel segment assignments and signals conveying dedicated control channel assignment information. In some embodiments, downlink signals include messages directed to WT 800 communicating base station attachment point loading information such that WT 800 can relay the information to another adjacent base station to which WT 800 is also connected. In some embodiments, downlink signals include at least one of a request to transfer loading factor information and a command to transfer loading factor information.

$2^{nd}$ transmitter module 820, e.g., an OFDM transmitter, is coupled to transmit antenna 824 via which the wireless terminal 800 transmits uplink signals to base stations. In some embodiments, the same antenna is used for receiver module 818 and transmitter module 824, e.g., in conjunction with a duplex module. The uplink signals include dedicated control channel reports including interference reports, e.g., beacon ratio reports using dedicated control channel segments allocated to the wireless terminal, uplink traffic channel signals, access signals, power control signals, timing control signals, and handoff signals. In some embodiments, the uplink signals also include messages conveying uplink loading factor information corresponding to a base station attachment point, e.g., with the wireless terminal acting as relay between two base stations. The inclusion of two receiver/transmitter pairs (802/804, 818/820), present in some embodiments, facilitates the support of concurrent wireless connections with two different base stations attachment points, which facilitates the transfer of base station attachment point uplink loading factor information between adjacent base station with wireless terminal 800 acting as a relay.

I/O devices 808, e.g., keypad, keyboard, microphone, switches, display, speaker, etc., allows a user of WT 800 to input data/information, access output data/information, and control at least some functions of the wireless terminal.

Memory 810 includes routines 826 and data/information 828. The processor 806, e.g., a CPU, executes the routines 826 and uses the data/information 828 in memory 800 to control the operation of the wireless terminal 800 and implement steps of methods. Routines 826 include communications routines 830 and base station control routines 832. The communications routines 830 implement various communications protocols used by the wireless terminal 800. The base station control routines 832 include a beacon signal measurement module 834, a pilot signal measurement module 836, a loading factor recovery module 838, and an interference report generation module 840. In some embodiments, e.g., some embodiments supporting two concurrent wireless communications links to two different base station attachment points, the wireless terminal includes a loading factor relay module 842.

Beacon signal measurement module 834 measures the received signal strength of beacon signals broadcast from base station attachment points. Pilot signal measurement module 836 measures the received signal strength of pilot channel signals broadcast from base station attachment points.

Loading factor recovery module 838 recovers loading factors corresponding to base station attachment points from broadcast station signals. For example, a base station broadcasts loading factors corresponding to its own base station attachment points and attachment points of adjacent base stations in its broadcast channel, and wireless terminal 800 receives the signals via $1^{st}$ receiver module 802 and recover the loading factor information using loading factor recovery module 838.

Interference report generation module 840, e.g., a beacon ratio report generation module, uses information obtained from beacon signal module 834 and/or pilot signal measurement module 836, and loading factor recovery module 838 in generating an interference report, e.g., a specific or genetic beacon ratio report. Loading factor recovery relay module 842 controls the relaying of received uplink loading factor information between adjacent base stations via wireless communication channels. For example, the wireless terminal may be concurrently connected to a base station attachment point of a first base station using receiver/transmitter pair (802/804) and a base station attachment point of a second base station, adjacent said first base station, using receiver/transmitter pair (818/820), and received uplink loading factor information corresponding to the first base station may be signaled via a message to the second base station, with the message being generated and signaled under the control of module 842. Thus via module 842, loading factor information can be opportunistically communicated between adjacent base stations utilizing a wireless terminal 800 which happens to be currently connected to the two adjacent base stations without the need for using the backhaul to transfer the loading factor information.

Data/information 828 includes a plurality of received and recovered uplink loading factors (received base station 1 loading factor 844, . . . , received base station N loading factor 846), measured pilot signal information corresponding to base stations (measured pilot signal information corresponding to BS 1 848, . . . , measured pilot signal information corresponding to base station N 849), measured beacon signal information (measured beacon signal information corresponding to base station 1 850, measured beacon signal information corresponding to base station N 851), generated interference report information 852, system base station information 864, and allocated resource information 854. In some embodiments, data/information 828 also includes base station loading factor relay message information 870.

Received base station loading factors (received base station 1 loading factor 844, . . . , received base station N loading factor 846) are outputs of loading factor recovery module 838. It is to be understood than an individual base station may, and sometimes does, have multiple uplink loading factors, e.g., corresponding to a plurality different attachment points at the base station, and wireless terminal sometimes recovers, stores and/or transmits multiple loading factors corresponding to the different base station attachment points of the same base station.

Measured pilot signal information (BS 1 pilot signal information 848, BS N pilot signal information 849) are outputs of module 836, while measured beacon signal information (BS 1 beacon signal info 850, BS N beacon signal information 851) are outputs of beacon signal measurement module 834. Measured pilot signal information (BS N) 849 shown as a dashed box to indicate that it may not be present in some embodiments. For example, an embodiment supporting two concurrent connection to two different base station attachment points, e.g., an embodiment including $2^{nd}$ receiver module 818/$2^{nd}$ transmitter module 820 may recover concurrently measurements from two base stations of pilot channel signals. However, some other embodiments, e.g., some embodiments using a single receiver module 802 may support a single set of pilot signal measurements 848 corresponding to the current attachment point and may utilize beacon signal measurements for evaluating signal strength from other base stations.

Generated interference report information 852, e.g., a generic or specific beacon ratio report using pilot and/or beacon signal measurements, and uplink loading factor information, is an output of interference report generation module 840. System base station information 864 includes information corresponding to a plurality of base stations (base station 1 information 866, . . . , base station n information 868). Base station 1 information 866 includes information corresponding to different attachment point of base station 1 including downlink timing and frequency structure information, uplink timing and frequency structure information, carrier information, tone block information, schedule information, including information identifying when a base station broadcasts uplink loading factors, and information identifying which adjacent base station attachment points are of interest to each of the attachment points of base station 1.

Allocated resource information 854 includes base station assigned identification information 856, e.g., a base station assigned wireless terminal ON state identifier, uplink dedicated control channel information 858, e.g., information identifying dedicated control channel segments allocated to the wireless terminal to transmit uplink control reports including uplink interference reports, uplink traffic channel information 860, e.g., information identifying uplink traffic channel segments assigned to the wireless terminal, and handoff information 862.

Base station loading factor relay message information 870 includes signals generated by loading factor relay module, e.g., signals used in passing an uplink loading factor from one base station to an adjacent base station via wireless terminal 800.

Figure 9:
FIG. 9 is a drawing of a table illustrating exemplary uplink loading factor information.

FIG. 9 is drawing of a table 900 of exemplary uplink loading factor information. First column 952 represents 8 different values, e.g., using 3 information bits, which may be communicated to wireless terminals in a downlink broadcast channel message corresponding to an attachment point of a base station sector and/or communicated in a message between base stations, e.g., between adjacent base stations, the value used to represent an uplink loading factor for a base station attachment point. Second column 954 expresses an uplink loading factor $b_i$ in dBs corresponding to a base station attachment point and represents different levels of uplink loading which can be communicated in accordance with this exemplary format. The loading factor value $b_i$ communicated is used with wireless terminals in generating interference reports, e.g., in generating beacon ratio reports. Communication value (0, 1, 2, 3, 4, 5, 6, 7) corresponds to loading factor, in dBs, (0, −1, −2, −3, −4, −6, −9, −infinity), respectively. Thus the exemplary loading factor expressed in real number values can take on eight possible values in the range of 1 to 0.

Figure 10:
FIG. 10 is a drawing of a table illustrating the format for an exemplary uplink interference report.

FIG. 10 is a drawing of a table 1000 of the format of an exemplary 4 bit uplink interference report, e.g., an exemplary 4 bit downlink beacon ratio report beacon ratio report (DL-BNR4). First column 1002 identifies the 16 alternative bit patterns that may be represented by the report. Second column 1004 identifies the interpretation associated with each potential bit pattern, e.g., a report adjusted power calculation level, e.g., the ratio of wireless terminal measured received downlink beacon channel signals from two or more base station attachment points, the ratio having been gain adjusted using uplink loading factors corresponding to the attachment points. In the example of table 1000 the report value ranges between −3 dBs and 26 dBs.

One exemplary specific beacon ratio report using measured beacon signals, where each beacon is transmitted at the same power level=$(PB_0*b_0)/(PB_1*b_1)$, where PB0 is the wireless terminal measured power of the received beacon signal from the serving base station to which the wireless terminal is currently connected, $PB_1$ is the wireless terminal measured power of the received beacon from the adjacent base station, $b_0$ is the uplink loading factor of the current serving base station, and $b_1$ is the uplink loading factor of the adjacent base station.

One exemplary generic beacon ratio report using measured beacon signals, where each beacon is transmitted at the same power level=$(PB_0*b_0)/((PB_1*b_1)+(PB_2*b_2))$, where $PB_0$ is the wireless terminal measured power of the received beacon signal from the serving base station to which the wireless terminal is connected, $PB_1$ is the wireless terminal measured power of the received beacon from a first adjacent base station attachment point, $PB_2$ is the wireless terminal measured power of the received beacon from a second adjacent base station attachment point, $b_0$ is the uplink loading factor of the current serving base station, and $b_1$ is the uplink loading factor of first adjacent base station attachment point, and $b_2$ is the uplink loading factor of the second adjacent base station attachment point. This exemplary type of beacon ratio report can be extended for N adjacent base station attachment points, $(PB_0*b_0)/((PB_1*b_1)+(PB_2*b_2)+, \ldots, +(PB_N*bn))$, where PBN is the measured received power on the Nth adjacent base station attachment point and bn is the uplink loading factor of the Nth adjacent base station attachment point.

Another exemplary generic beacon ratio report using measured beacon signals, where each beacon is transmitted at the same power level=$(PB_0*b_0)/\max((PB_1*b_1), (PB_2*b_2))$, where $PB_0$ is the wireless terminal measured power of the received beacon signal from the serving base station to which the wireless terminal is connected, $PB_1$ is the wireless terminal measured power of the received beacon from a first adjacent base station attachment point, $PB_2$ is the wireless terminal measured power of the received beacon from a second adjacent base station attachment point, $b_0$ is the uplink loading factor of the current serving base station, and $b_1$ is the uplink loading factor of first adjacent base station attachment point, and $b_2$ is the uplink loading factor of the second adjacent base station attachment point. This exemplary type of beacon ratio report can be extended for N adjacent base station attachment points, $(PB_0*b_0)/\max((PB_1*b_1), (PB_2*b_2), \ldots, (PB_N*bn))$, where $PB_N$ is the measured received power on the Nth adjacent base station attachment point and $b_n$ is the uplink loading factor of the Nth adjacent base station attachment point.

In some embodiments, different base station attachment points transmit their beacon signals at different power levels, and additional gain adjustment factors are utilized in the beacon ratio reports. In some embodiments, a mixture of pilot and beacon signals are utilized in a beacon ratio report and additional gain adjustments factors are used to equalize scaling. In some embodiments, different base station attachment points transmit pilots at different power levels and additional gain adjustment factors are used to equalize scaling.

It should be appreciated that if a wireless terminal were unable to receive adjacent base station loading factor information, the wireless terminal might have to use a default value for the unrecovered adjacent base station loading factor which is needs for calculating a report. In such a situation, the wireless terminal might use a conservative default value for the unrecovered loading factor of the adjacent base station resulting in an overestimate of the interference level. This would have a tendency to result in wasted air link resources when the base station considers the interference report and allocates resources. Thus by communicating the adjacent base station loading factors via a current connection, the likelihood that the wireless terminal will be able to successfully recover the adjacent base stations' loading factor is significantly improved. This may result in a more accurate and better controlled interference report. The base station by being provided with more consistent and accurate interference reports can more efficiently allocate resources and manage interference.

Figure 11:
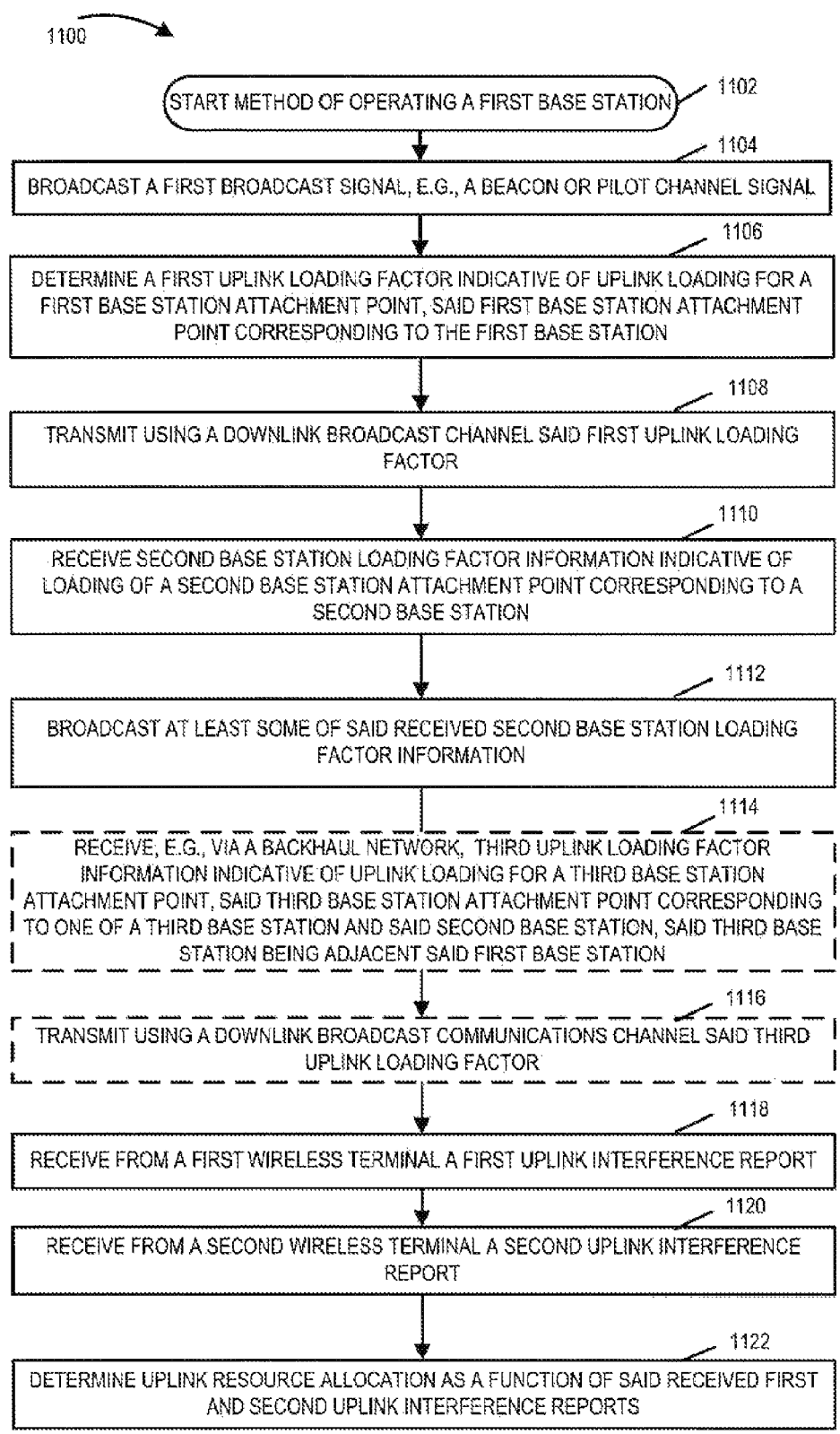
FIG. 11 is a drawing of a flowchart of an exemplary method of operating a base station in accordance with various embodiments.

FIG. 11 is a drawing of a flowchart 1100 of an exemplary method of operating a first base station in a multiple access wireless communication system including a plurality of base stations. Each base station in the wireless communications system includes at least one base station attachment point. The first base station may be a single sector base station or a multi-sector base station. For example, in one exemplary embodiment an attachment point of a single sector base station corresponds to a cell, downlink carrier, downlink tone block, corresponding uplink carrier and corresponding uplink tone block combination; while an attachment point of multi-sector base station corresponds to a cell, sector, downlink carrier, downlink tone block, corresponding uplink carrier and corresponding uplink tone block combination.

Operation starts in step 1102, where the first base station is powered on and initialized. Operation proceeds from start step 1102 to step 1104. In step 1104, the first base station broadcasts a first broadcast signal, e.g., a beacon or pilot channel signal. In some embodiments, the first base station broadcast both beacon signals and pilot channel signals. In some embodiments, the first broadcast signal is broadcast in accordance with a recurring downlink channel structure. Operation proceeds from step 1104 to step 1106. In step 1106, the first base station determines a first uplink loading factor indicative of uplink loading for a first base station attachment point, said first base station attachment point corresponding to the first base station. Then, in step 1108, the first base station transmits, using a downlink broadcast channel, said first uplink loading factor. Operation proceeds from step 1108 to step 1110.

In step 1110, the first base station receives second base station loading factor information indicative of loading of a second base station attachment point corresponding to a second base station. In some embodiments, the second base station is physically adjacent said first base station and receiving said second base station loading factor information includes receiving said second base station loading factor information over a backhaul link between the first and second base stations. In some embodiments, the second base station is physically adjacent said first base station and receiving said second base station loading factor information includes receiving said second base station loading factor information from a mobile communication device which received said second base station loading factor information over a wireless communication link. For example, the mobile communications device, is in some embodiments, a mobile wireless terminal supporting multiple concurrent wireless communications links.

Then, in step 1112, the first base station broadcasts at least some of said received second base station loading factor information. For example, the first base station broadcasts a second uplink loading factor corresponding to said second base station attachment point, said second uplink loading factor being included in said at least some second base station loading factor information. In some embodiments, transmitting at least some of said second base station loading factor information uses orthogonal frequency division multiplexing signals. Operation proceeds from step 1112 to step 1114 or step 1118. Steps 1114 and steps 1116 are performed in some embodiments for some base stations, while not performed for other base stations. For example, if the first base station has multiple adjacent base stations in the wireless communications system using the same uplink frequency spectrum, and potentially interfering with one another, then steps 1114 and 1116 are, in some embodiments, preformed by the first base station.

In step 1114, the first base station receives, e.g., via a backhaul network, third uplink loading factor information indicative of uplink loading for a third base station attachment point, said third base station attachment point corresponding to one of a third base station and said second base station, said third base station being adjacent to said first base station. In some embodiments, where the third attachment point corresponds to said second base station said second and third base station attachment points corresponds to different, e.g., adjacent, sectors of the second base station. Then, in step 1116, the first base station transmits, using a downlink broadcast communications channel, said third uplink loading factor. Operation proceeds from step 1116 to step 1118.

In step 1118, the first base station receives from a first wireless terminal a first uplink interference report, e.g., a beacon ratio report, and in step 1120, the first base station receives from a second wireless terminal a second uplink interference report, e.g., a beacon ratio report. In some embodiments, the first and second uplink interference reports are a function of the transmitted first and second loading factors. In various embodiments, the first uplink interference report is a function of a received power level measured by the first wireless terminal of the first broadcast signal, the first uplink loading factor, a received power level measurement by the first wireless terminal of a second broadcast signal from the second base station and the second uplink loading factor. In some such embodiments, the first broadcast signal from the first base station is one of a beacon and a pilot channel signal and the second broadcast signal from the second base station is one of a beacon and a pilot channel signal.

In some embodiments for some base stations for at least some first and second interference reports, the first and second uplink interference reports have been determined by said first and second wireless terminals as a function of said first, second, and third uplink loading factors. For example, the first base station may have at least two adjacent base stations sharing the same frequency spectrum, and the first and second interference reports may be generic type reports using power measurement information and loading factor information from the three base stations. Alternatively, the first and second interference reports may be a specific type of interference reports comparing received power measurements from two base stations, e.g., the first base station and one other selected adjacent base station, and using loading factor information from the first base station and the one other selected adjacent base station.

Then, in step 1122, the first base station determines uplink resource allocation as a function of said received first and second uplink interference reports. In some embodiments, determining uplink resource allocation as a function of the received first and second uplink interference reports includes scheduling traffic channel segments. In some embodiments, determining uplink resource allocation as a function of said received first and second uplink interference report includes initiating a handoff of the first wireless terminal form the first attachment point to the second attachment point. In some embodiments, determining uplink resources allocation as a function of said received first and second uplink interference reports includes changing dedicated control channel allocation. In some embodiments, determining uplink resource allocation as a function of said received first and second uplink interference reports includes initialing a change of said first wireless terminal to use a different attachment point of the first base station, e.g., use a different carrier and/or sector for attachment to the first base station.

In some embodiments, the first base station transmits uplink loading factors in accordance with a downlink transmission recurring schedule; the first base station allocates uplink segments to the first wireless terminal to transmit uplink interference reports in accordance with a recurring uplink schedule; and the uplink interference reports from the first wireless terminal are schedules to be received by the first base station at a higher frequency than an uplink loading factor corresponding to an attachment point is scheduled to be transmitted. Uplink interference reports are, in some embodiments, allocated predetermined positions within an uplink dedicated control channel and uplink loading factor information is allocated predetermined positions within a downlink broadcast channel structure.

Figure 12A:
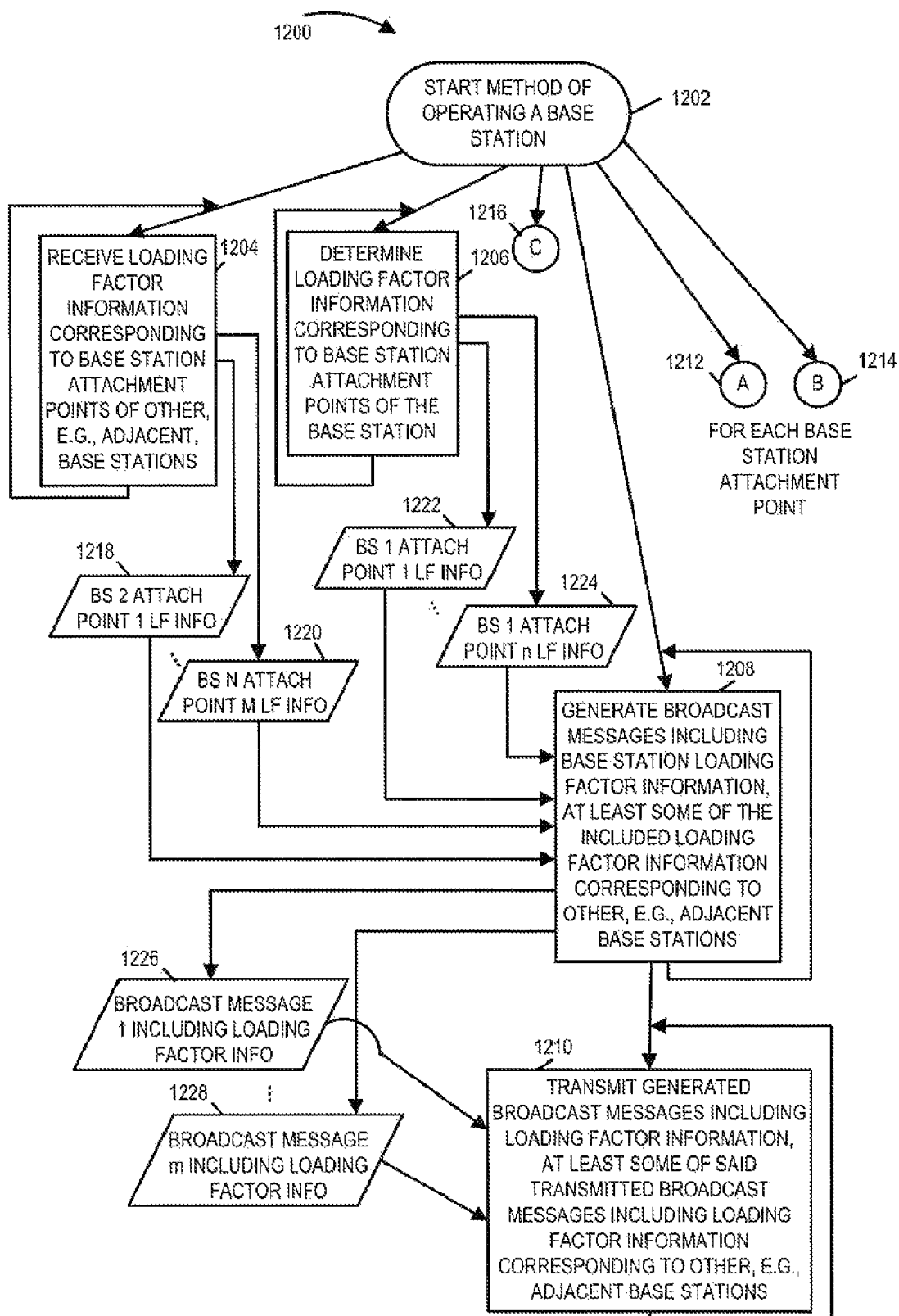
FIG. 12 comprising the combination of FIG. 12A
FIG. 12B is a drawing of a flowchart of an exemplary method of operating a base station in accordance with various embodiments.
Figures 12, 12A, 12B:
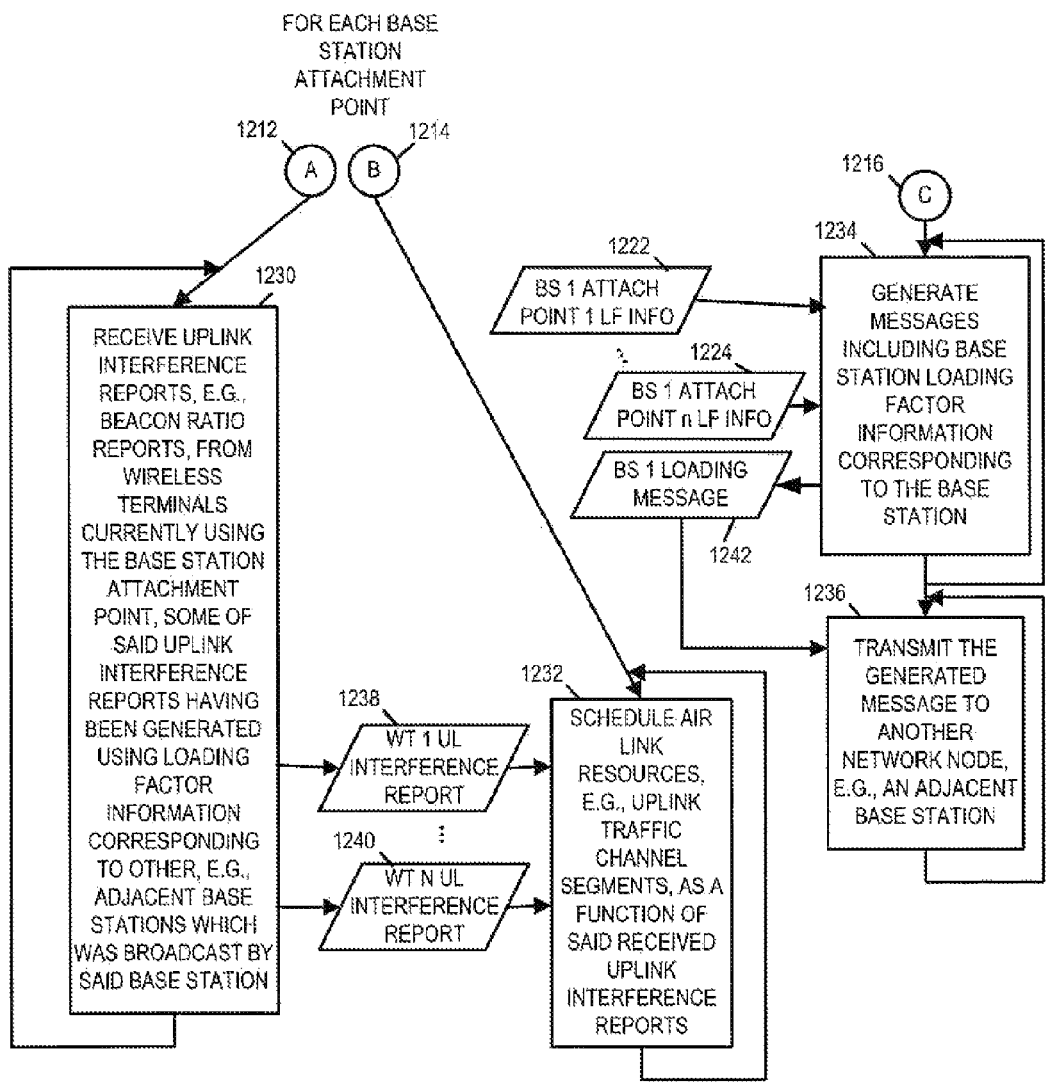

FIG. 12 comprising the combination of FIG. 12A and FIG. 12B is a drawing of a flowchart 1200 of an exemplary method of operating a base station in a multiple access wireless communications system including a plurality of base stations, e.g., an OFDM spread spectrum multiple access wireless communications system including uplink tone hopping. Operation starts in step 1202, where the base station is powered on an initialized. Operation proceeds form start step 1202 to step 1204, step 1206, step 1208, connecting node A 1212, connecting node B 1214 and connecting node C 1216.

In step 1204, the base station receives loading factor information corresponding to base station attachment points of other, e.g., adjacent, base stations. The reception is, in some embodiments, through a network interface receiver via a backhaul network link and/or via wireless link to a mobile. The operation of step 1204 is performed on an ongoing basis. First step 1204 attachment point information corresponding to other base stations (BS 2 attachment point 1 loading factor information 1218, . . . , BS N attachment point M loading factor information 1220) is obtained and forwarded to step 1208.

In step 1206, the base station determines loading factor information corresponding to base station attachment points of the base station (BS 1 attachment point 1 loading factor information 1222, . . . , base station 1 attachment point n loading factor information 1224). The determined loading factor information (1222, 1224) is provided as an input to step 1208. Step 1206 is performed by the base station on an ongoing basis, e.g., readjusting the loading factor corresponding to an attachment point as a function of changes in the number of On state users, changes in the amount of backlog frames requested to be communicated in uplink traffic channel segments, and changes in uplink traffic channel data rate information associated with wireless terminals.

In step 1208, the base station generates broadcast messages including base station loading factor information, at least some of the transmitted broadcast messages including loading factor information corresponding to other, e.g., adjacent base stations. Step 1208 is performed on an ongoing basis. Outputs from step 1208 include a plurality of broadcast messages including loading factor information (broadcast message 1 including loading factor information 1226, . . . , broadcast message m including loading factor information 1228. Operation proceeds from step 1208 to step 1210. In step 1210, the base station transmits over the air link generated broadcast messages including loading factor information, at least some of said transmitted messages including loading factor information corresponding to other, e.g., adjacent base stations. Step 1210 is performed on an ongoing basis, e.g., in accordance with predetermined positions reserved for loading factor information in a broadcast channel in a recurring downlink channel structure.

For each base station attachment point of the base station operation proceeds from uplink connecting node A 1212 to step 1230. In step 1230, the base station receives uplink interference reports, e.g., beacon ratio reports, from wireless terminals currently using the base station attachment point, some of said uplink interference reports having been generated using loading factor information corresponding to other, e.g., adjacent base stations, the loading factor information having been previously broadcast by the base station. Step 1230 is preformed on an ongoing basis. For example, at predetermined positions within a recurring uplink channel structure including a dedicated control channel, dedicated control channel segments carry interference reports from the current On state wireless terminals using the base station attachment point. Recovered interference reports (WT 1 uplink interference report 1238, . . . , WT N uplink interference report 1240) is output from step 1230 and used as input in step 1232.

For each base station attachment point of the base station operation proceeds from connecting mode B 1214 to step 1232. In step 1232, the base station schedules air link resources, e.g., uplink traffic channel segments, as a function of said received uplink interference reports. Step 1232 is performed on an ongoing basis.

From connecting node C 1216, operation proceeds to step 1234. In step 1234, the base station generates messages including base station loading factor information corresponding to the base station. Base station 1 attachment point loading factor information (BS attachment point 1 loading factor information 1222, . . . , BS attachment point n loading factor information 1224) is an input to step 1234, while generated BS 1 loading message 1242 is an output of step 1234. Message 1242 includes loading factor information corresponding to one or more attachment points of the base station. For example, the base station may be a single sector base station with only one attachment point, and the message 1224 includes the loading factor information corresponding to the single attachment point. Alternatively, the base station may include multiple attachment points corresponding to multiple sectors and/or carriers. With multiple attachment points, message 1242 in some embodiments conveys loading factor information corresponding to a single attachment point. With multiple attachment points, message 1242 in some embodiments conveys loading factor information corresponding to a set of attachment point corresponding to the base station. The set of attachment points corresponding to a message 1242 may be a subset of the complete set of loading factor information corresponding to the base station. For example, some base station attachment point loading factor information may be relevant to an adjacent base station while other base station attachment point loading factor information may not be relevant, e.g., as a function of coverage area and/or frequency spectrum utilized. Step 1234 is performed on an ongoing basis. Operation proceeds from step 1234 to step 1236.

In step 1236, the base station transmits the generated message 1242 to another network node, e.g., an adjacent base station. For example, the transmission may be via a backhaul network. In some such embodiments, the message including loading factor information is sourced from the base station with the destination being an adjacent base station. Alternatively, the transmitted message including loading factor information, in some embodiments, directed to a central node which collects loading factor information from a plurality of base stations in the system, and then forwards the relevant loading factor information to individual base station, e.g., as a function of topology. Alternatively, a base station, in some embodiments, utilizes a wireless terminal currently connected to itself and an adjacent base station to forward loading factor information to an adjacent base station. Step 1236 is performed on an ongoing basis.

In some embodiments, loading factor information is exchanged between adjacent base stations in accordance with a recurring timing structure. In some embodiments, loading factor information is communicated by a base station in response to a request from an adjacent base station. In some embodiments, loading factor information is communicated by a base station in response to a predetermined condition being satisfied, e.g., a base station communicates loading factor information in response to a high level of loading being reached. In some embodiments, loading factor information is communicated in response to a detected change of loading at the base station.

While described in the context of an OFDM system, the methods and apparatus of various embodiments, are applicable to a wide range of communications systems including many non-OFDM and/or non-cellular systems.

In various embodiments nodes described herein are implemented using one or more modules to perform the steps corresponding to one or more methods, for example, signal processing, beacon generation, beacon detection, beacon measuring, connection comparisons, connection implementations. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are described to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first base station in a multiple access wireless communications system including a plurality of base stations, each of said plurality of base stations including at least one base station attachment point, the method comprising:

determining a first uplink loading factor indicative of uplink loading for a first base station attachment point, said first base station attachment point corresponding to the first base station;

receiving second base station loading factor information from a mobile communications device which received said second base station loading factor information over a wireless communications link with said second base station, said second base station loading factor information being indicative of loading by multiple concurrent users of a second base station attachment point corresponding to a second base station;

broadcasting at least some of said received second base station loading factor information;

wherein broadcasting said at least some second base station loading factor information includes transmitting, using a downlink broadcast communications channel said first uplink loading factor, wherein said at least some second base station loading factor information includes a second uplink loading factor corresponding to said second base station attachment point, second base station loading factor information being indicative of loading of said second base station attachment point by multiple concurrent users;

receiving from a first wireless terminal a first uplink interference report;

receiving from a second wireless terminal a second uplink interference report; and determining uplink resource allocation as a function of said received first and second uplink interference reports.

2. The method of claim 1, wherein said second base station is a multi-sector base station.

3. The method of claim 1, wherein said second base station is physically adjacent said first base station.

4. The method of claim 1, wherein said first and second uplink interference reports are a function of said transmitted first and second uplink loading factors.

5. The method of claim 4, further comprising,
prior to receiving the first uplink interference report, broadcasting a first broadcast signal; and
wherein said first uplink interference report is a function of a received power level measured by the first wireless terminal of said first broadcast signal, the first uplink loading factor, a received power level measurement by the first wireless terminal of a second broadcast signal from the second base station, and the second uplink loading factor.

6. The method of claim 5, wherein said first broadcast signal from the first base station is one of a beacon and a pilot channel signal, and wherein said second broadcast signal from the second base station is one of a beacon and a pilot channel signal.

7. The method of claim 1, wherein determining uplink resource allocation as a function of said received first and second uplink interference reports includes scheduling traffic channel segments.

8. The method of claim 1, wherein determining uplink resource allocation as a function of said received first and second uplink interference reports includes initiating a handoff of the first wireless terminal from said first attachment point to said second attachment point.

9. The method of claim 1, further comprising:
receiving, via a backhaul link, a third uplink loading factor indicative of uplink loading for a third base station attachment point, said third base station attachment point corresponding to a third base station, said third base station being adjacent said base station; and transmitting using a downlink broadcast communications channel said third uplink loading factor, wherein said first and second uplink interference reports have been determined as a function of said transmitted first, second, and third uplink loading factors.

10. The method of claim 1, further comprising:

receiving, via a backhaul network, a third uplink loading factor indicative of uplink loading for a third base station attachment point, said third base station attachment point corresponding to said second base station, said second and third base station attachment points corresponding to different sectors of said second base station; and transmitting using a downlink broadcast communications channel said third uplink loading factor, wherein said first and second uplink interference reports have been determined as a function of said transmitted first, second, and third uplink loading factors.

11. The method of claim 1, wherein said first base station transmits uplink loading factors in accordance with a downlink transmission recurring schedule, wherein said first base station allocates uplink segments to said first wireless terminal to transmit uplink interference reports in accordance with a recurring uplink schedule, and wherein uplink interference reports from said first wireless terminal are scheduled to be received at a higher frequency than an uplink loading factor corresponding to an attachment point is scheduled to be transmitted.

12. The method of claim 1, wherein the first and second interference reports are beacon ratio reports.

13. The method of claim 7, wherein broadcasting at least some of said received second base station loading factor information includes:

transmitting said at least some second base station loading factor information using orthogonal frequency division multiplexing signals.

14. A first base station for use in a multiple access wireless communications system including a plurality of base stations, each of said plurality of base stations including at least one base station attachment point, the first base station comprising:

an uplink loading factor determination module for determining a first uplink loading factor indicative of uplink loading for a first base station attachment point, said first base station attachment point corresponding to the first base station;

a first receiver for receiving second base station loading factor information from a mobile communications device which received said second base station loading factor information over a wireless communications link with said second base station, said second base station loading factor information being indicative of loading by multiple concurrent users of a second base station attachment point corresponding to a second base station;

a transmitter module for broadcasting at least some of said received second base station loading factor information;

a wireless receiver for receiving from a first wireless terminal a first uplink interference report and for receiving from a second wireless terminal a second uplink interference report; and a resource allocation module for allocating uplink resources as a function of said received first and second uplink interference reports.

15. The first base station of claim 14, wherein said second base station is a multi-sector base station.

16. The first base station of claim 14, wherein said second base station is physically adjacent said first base station.

17. The first base station of claim 14, further comprising:

a memory for storing received loading factor information and said first and second uplink interference reports, said first and second uplink interference reports being a function of said transmitted first and second uplink loading factors.

18. The first base station of claim 17, further comprising:

at least one of a beacon module and pilot module for controlling the generation of at least one of beacon and pilot channel signals to be broadcast as a first broadcast signal; and wherein said first uplink interference report is a function of a received power level measured by the first wireless terminal of said first broadcast signal, the first uplink loading factor, a received power level measurement by the first wireless terminal of a second broadcast signal from the second base station, and the second uplink loading factor.

19. The first base station of claim 14, wherein said first and second base station include multiple sectors and wherein said second base station attachment point corresponds to one carrier of one sector of said second base station.

20. The first base station of claim 14, wherein said transmitter module includes an orthogonal frequency division multiplexing transmitter.

21. A first base station for use in a multiple access wireless communications system including a plurality of base stations, each of said plurality of base stations including at least one base station attachment point, the first base station comprising:

uplink loading factor determination means for determining a first uplink loading factor indicative of uplink loading for a first base station attachment point, said first base station attachment point corresponding to the first base station;

first receiver means for receiving second base station loading factor information from a mobile communications device which received said second base station loading factor information over a wireless communications link with said second base station, said second base station loading factor information being indicative of loading by multiple concurrent users of a second base station attachment point corresponding to a second base station;

transmitter means for broadcasting at least some of said received second base station loading factor information;

wireless receiver means for receiving from a first wireless terminal a first uplink interference report and for receiving from a second wireless terminal a second uplink interference report; and resource allocation means for allocating uplink resources as a function of said received first and second uplink interference reports.

22. The first base station of claim 21, wherein said second base station is a multi-sector base station.

23. The first base station of claim 21, wherein said second base station is physically adjacent said first base station.

24. The first base station of claim 21, further comprising:

memory means for storing received loading factor information and said first and second uplink interference reports, said first and second uplink interference reports being a function of said transmitted first and second uplink loading factors.

25. The first base station of claim 21, wherein said first and second base station include multiple sectors and wherein said second base station attachment point corresponds to one carrier of one sector of said second base station.

26. The first base station of claim 21, wherein said transmitter means includes an orthogonal frequency division multiplexing transmitter.

27. A non-transitory computer readable medium embodying machine executable instructions for controlling a first base station in a multiple access wireless communications system including a plurality of base stations, the non-transitory computer readable medium comprising:
  instructions for causing the first base station to determine a first uplink loading factor indicative of uplink loading for a first base station attachment point, said first base station attachment point corresponding to the first base station;
  instructions for causing the first base station to receive second base station loading factor information from a mobile communications device which received said second base station loading factor information over a wireless communications link with said second base station, said second base station loading factor information being indicative of loading by multiple concurrent users of a second base station attachment point corresponding to a second base station;
  instructions for causing the first base station to broadcast at least some of said received second base station loading factor information;
  wherein said instructions for causing the first base station to broadcast at least some of said received second base station loading factor information includes instructions for causing the first base station to transmit, using a downlink broadcast communications channel, said first uplink loading factor in addition to said at least some second base station loading factor information, wherein said at least some second base station loading factor information includes a second uplink loading factor corresponding to said second base station attachment point, second base station loading factor information being indicative of loading of said second base station attachment point by multiple concurrent users;
  instructions for causing the first base station to receive from a first wireless terminal a first uplink interference report;
  instructions for causing the first base station to receive from a second wireless terminal a second uplink interference report; and
  instructions for causing the first base station to determine uplink resource allocation as a function of said received first and second uplink interference reports.

28. The non-transitory computer readable medium of claim 27, wherein said second base station is a multi-sector base station.

29. The non-transitory computer readable medium of claim 27, wherein said second base station is physically adjacent said first base station.

30. A first base station operable in a communications system, the first base station comprising:
  a processor configured to:
    determine a first uplink loading factor indicative of uplink loading for a first base station attachment point, said first base station attachment point corresponding to the first base station;
    control reception of second base station loading factor information from a mobile communications device which received said second base station loading factor information over a wireless communications link with said second base station, said second base station loading factor information being indicative of loading by multiple concurrent users of a second base station attachment point corresponding to a second base station;
    control broadcasting of at least some of said received second base station loading factor information;
    control transmission, using a downlink broadcast communications channel, of said first uplink loading factor in addition to said at least some second base station loading factor information, wherein said at least some second base station loading factor information includes a second uplink loading factor corresponding to said second base station attachment point, second base station loading factor information being indicative of loading of said second base station attachment point by multiple concurrent users;
    control reception from a first wireless terminal of a first uplink interference report;
    control reception from a second wireless terminal of a second uplink interference report; and
    determine uplink resource allocation as a function of said received first and second up link interference reports.

31. The base station of claim 30, wherein said second base station is a multi-sector base station.

32. The base station of claim 30, wherein said second base station is physically adjacent said first base station.

33. The method of claim 1, further comprising:
  transmitting a message to said mobile communications device requesting said second base station loading factor information.

34. The method of claim 1, wherein said second base station loading factor information is received from said mobile communications device according to a schedule.

35. The method of claim 1, wherein said second base station loading factor information is received from said mobile communications device in response to a signal from the second base station.

36. The method of claim 1, wherein said second base station loading factor information is received from said mobile communications device in response to a change detected by said mobile communications device in the second base station loading factor.

37. The method of claim 1, wherein said second base station loading factor information is received from said mobile communications device in response to the first base station broadcasting stale information regarding the second base station loading factor.

* * * * *